United States Patent
Arioua et al.

(10) Patent No.: US 12,298,405 B2
(45) Date of Patent: May 13, 2025

(54) IMAGING SYSTEMS, DEVICES AND METHODS

(71) Applicant: Sony Semiconductor Solutions Corporation, Kanagawa (JP)

(72) Inventors: Madani Arioua, Grez-Doiceau (BE); Pepe Gil-Cacho, Saint-Josse-ten-Noode (BE)

(73) Assignee: Sony Semiconductor Solutions Corporation, Kanagawa (JP)

( * ) Notice: Subject to any disclaimer, the term of this patent is extended or adjusted under 35 U.S.C. 154(b) by 29 days.

(21) Appl. No.: 17/622,434

(22) PCT Filed: Jul. 8, 2020

(86) PCT No.: PCT/EP2020/069240
§ 371 (c)(1),
(2) Date: Dec. 23, 2021

(87) PCT Pub. No.: WO2021/005105
PCT Pub. Date: Jan. 14, 2021

(65) Prior Publication Data
US 2022/0397675 A1   Dec. 15, 2022

(30) Foreign Application Priority Data

Jul. 9, 2019 (EP) .................................... 19185258

(51) Int. Cl.
*G01S 17/894* (2020.01)
*G01S 7/497* (2006.01)
*H04N 23/71* (2023.01)

(52) U.S. Cl.
CPC ............ *G01S 17/894* (2020.01); *G01S 7/497* (2013.01); *H04N 23/71* (2023.01)

(58) Field of Classification Search
CPC ...... G01S 17/894; G01S 7/497; G01S 7/4802; H04N 23/71; G01N 21/538
USPC ......................................................... 348/135
See application file for complete search history.

(56) References Cited

U.S. PATENT DOCUMENTS

| | | | |
|---|---|---|---|
| 9,137,439 B1* | 9/2015 | Voris | H04N 23/64 |
| 10,058,290 B1* | 8/2018 | Proud | A61B 5/749 |
| 2005/0069207 A1* | 3/2005 | Zakrzewski | G06V 20/52 |
| | | | 382/218 |

(Continued)

FOREIGN PATENT DOCUMENTS

| | | |
|---|---|---|
| CA | 2 053 758 A1 | 4/1993 |
| EP | 0 635 731 A2 | 1/1995 |
| WO | WO-2015133910 A2 | 9/2015 |

OTHER PUBLICATIONS

International Search Report and Written Opinion mailed Oct. 6, 2020 in connection with International Application No. PCT/EP2020/069240.

*Primary Examiner* — Thai Q Tran
*Assistant Examiner* — Stephen R Smith
(74) *Attorney, Agent, or Firm* — Wolf, Greenfield & Sacks, P.C.

(57) ABSTRACT

An imaging system comprising circuitry configured to obtain (S2) image data of a scene that is illuminated with patterned light (PL), determine (S5, S6) bright regions and dark regions based on the image data, and relate image information related to the bright regions to image information related to the dark regions in order to determine characteristics of atmospheric aerosol particles (AP).

22 Claims, 13 Drawing Sheets

(56) References Cited

U.S. PATENT DOCUMENTS

| | | | |
|---|---|---|---|
| 2005/0286026 A1* | 12/2005 | Matsumoto | H04N 5/74 |
| | | | 353/101 |
| 2013/0314694 A1* | 11/2013 | Tchoryk, Jr. | G01S 17/58 |
| | | | 356/28.5 |
| 2014/0098222 A1* | 4/2014 | Yamazaki | H04N 23/71 |
| | | | 348/135 |
| 2015/0110356 A1* | 4/2015 | Qian | H04N 23/741 |
| | | | 382/103 |
| 2015/0212598 A1* | 7/2015 | Lee | G06F 3/0362 |
| | | | 345/166 |
| 2015/0331107 A1* | 11/2015 | Galera | H04N 23/741 |
| | | | 382/165 |
| 2017/0236288 A1* | 8/2017 | Sundaresan | G06T 7/215 |
| | | | 382/173 |
| 2018/0003807 A1* | 1/2018 | Galera | G01S 7/4863 |
| 2018/0007343 A1* | 1/2018 | Send | H04N 13/271 |
| 2019/0056504 A1 | 2/2019 | Hartman et al. | |
| 2019/0304115 A1 | 10/2019 | Sladkov | |
| 2020/0249354 A1* | 8/2020 | Yeruhami | G01S 7/4817 |
| 2021/0142496 A1* | 5/2021 | Sato | G06T 7/55 |
| 2022/0044921 A1* | 2/2022 | McLoughlin | G01N 15/1425 |

\* cited by examiner

IMAGING SYSTEMS, DEVICES AND METHODS

CROSS-REFERENCE TO RELATED APPLICATIONS

This application claims the benefit under 35 U.S.C. § 371 as a U.S. National Stage Entry of International Application No. PCT/EP2020/069240, filed in the European Patent Office as a Receiving Office on Jul. 8, 2020, which claims priority to European Patent Application Number 19185258.1 filed in the European Patent Office on Jul. 9, 2019, each of which is hereby incorporated by reference in its entirety.

TECHNICAL FIELD

The present disclosure generally pertains to the field of imaging systems and methods for imaging systems.

TECHNICAL BACKGROUND

A time-of-flight camera is a range imaging camera system that determines the distance of objects measuring the time-of-flight (ToF) of a light signal between the camera and the object for each point of the image. A time-of-flight camera thus receives a depth map of a scene. Generally, a time-of-flight camera has an illuminator that illuminates a region of interest with modulated light, and a pixel array that collects light reflected from the same region of interest. As individual pixels collect light from certain parts of the scene, a time-of-flight camera may include a lens for imaging while maintaining a reasonable light collection area.

Additionally, indirect time-of-flight (iToF) cameras are known, which measure the phase-delay between modulated light and reflected light, e.g. infrared (IR) light. Phase data is obtained by correlating the reflected signal with a reference signal (modulation signal). A typical number of four frames is used to calculate the depth image, wherein different phase offsets are applied for each frame.

Although there exist illumination techniques for ToF cameras, it is generally desirable to provide better illumination techniques for a ToF camera.

SUMMARY

According to a first aspect the disclosure an imaging system comprising circuitry configured to obtain image data of a scene that is illuminated with patterned light, determine bright regions and dark regions based on the image data, and relate image information related to the bright regions to image information related to the dark regions in order to determine characteristics of atmospheric aerosol particles.

According to a second aspect, the disclosure provides a method to configured to obtain image data of a scene that is illuminated with patterned light, determine bright regions and dark regions based on the image data, and relate image information related to the bright regions to image information related to the dark regions in order to determine characteristics of atmospheric aerosol particles.

According to a third aspect, the disclosure provides an imaging system comprising circuitry configured to obtain a first image data of a scene that is illuminated with patterned light and a second image data of a scene that is illuminated with patterned light, and compare the first image data with the second image data in order to determine characteristics of atmospheric precipitation particles.

According to a fourth aspect, the disclosure provides a method to obtain a first image data of a scene that is illuminated with patterned light and a second image data of a scene that is illuminated with patterned light, and compare the first image data with the second image data in order to determine characteristics of atmospheric precipitation particles.

Further aspects are set forth in the dependent claims, the following description and the drawings.

BRIEF DESCRIPTION OF THE DRAWINGS

Embodiments are explained by way of example with respect to the accompanying drawings, in which.

DETAILED DESCRIPTION OF EMBODIMENTS

Figure 1:
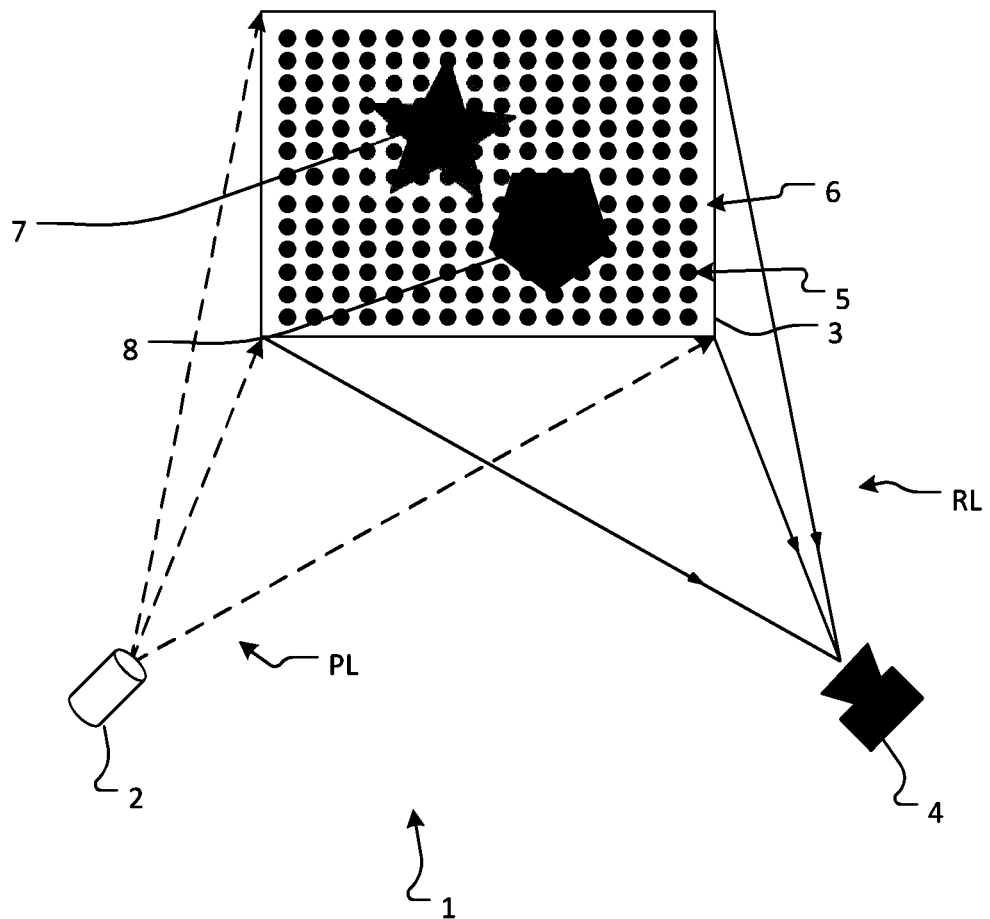
FIG. 1 illustrates an embodiment of the basic operational principle of a time-of-flight (ToF) system that uses patterned light ("structured light")

Before a detailed description of the embodiments under reference of FIG. 1, general explanations are made.

The first embodiments described below provide an imaging system comprising circuitry configured to obtain image data of a scene that is illuminated with patterned light, determine bright regions and dark regions based on the image data, relate image information related to the bright regions to image information related to the dark regions in order to determine characteristics of atmospheric aerosol particles.

The imaging system may be configured to illuminate a scene affected by one or a combination of the atmospheric particles pointed before with a high frequency and high contrast light illuminator. An appropriate imager facing the scene mentioned before may be used to track and evaluate the intensity related to dark and bright region caused by the illumination on the scene. An image sensor of the imaging system may produce a fixed number of frames (image) per unit of time. Each of these frames may content both position and intensity information. The image data may be further generated, for example, by a time of flight (ToF) sensor of a ToF camera. Moreover, the system and/or its circuitry may include an interface that is configured to obtain the image data. Circuitry of the system may include a processor, a memory (RAM, ROM or the like), a memory and/or storage, interfaces, etc. Circuitry may comprise or may be connected with input means (mouse, keyboard, camera, etc.), output means (display (e.g. liquid crystal, (organic) light emitting diode, etc.)), loudspeakers, etc., a (wireless) interface, etc., as it is generally known for electronic devices (computers, smartphones, etc.). Moreover, circuitry may comprise or may be connected with sensors for sensing still images or video image data (image sensor, camera sensor, video sensor, etc.), for sensing environmental parameters (e.g. radar, humidity, light, temperature), etc.

The atmospheric aerosols particles may be e.g. fog, mist, dust etc. The atmospheric aerosols particles may deteriorate the performance of sensing and imaging systems particularly Time-Of-Flight (ToF) systems.

The patterned light comprises high-intensity light areas and low-intensity light areas. The patterned light may be a high-contrast patterned light. The high-contrast patterned light may be a light with a high-frequency and high-contrast illumination pattern. The high-contrast patterned light scene may be a light spot pattern that may include multiple light spots (also called light dots). The light spot pattern may be regular or irregular. For example, the light spot pattern may be a regular matrix of multiple light spots (generally, spots may have any type of shape, e.g. linear, circular, elliptic, rectangular, any type of polygon, etc.) having the same or similar distance to each other or an irregular array of light spots. The light pattern may have a predefined border, e.g., rectangular, circular, elliptic, or the like. Using the light spot pattern the observed scene may be spatially encoded. While not being dense enough to act as a high-resolution structured light source, the light spot pattern still allows to deduce low-resolution depth information about the scene from observing a change in subsequently sensed light spot pattern. Alternatively, the light pattern may be a light stripe pattern such as a raster of lines or curves for which spacing could be regular and/or orthogonal, or fully random, etc., and, thus, as discussed, the resulting light pattern may have also areas (light dots) having the form of, e.g., a raster of lines or curves, shapes (circular, elliptic, rectangular, polygon) for which spacing could be regular and/or orthogonal, or fully random, etc. The light pattern is not limited to the mentioned light spot pattern or the light stipe pattern. Also other light pattern, for example grit type pattern, valley pattern or the like, may be used as light pattern. The valley pattern is typically a pattern, which is opposite to the above described light spot pattern. In case where the imaging system is implemented in a Time of flight camera (ToF), the light pattern projected to the scene and accordingly, the reflected light pattern sensed by the ToF sensor are the same for both, depth analysis by ToF imaging and motion analysis by structured light imaging. Accordingly, the reflected light pattern underlying the ToF imaging is also underlying the structured light imaging. Thus, no additional measurements other than the ToF measurements have to be carried out for the motion analysis by structured light imaging. In the context of TOF technology, the depth image in presence of the previously mentioned atmospheric particles AP and precipitation quality may be enhancement by coupling a high-frequency and high-contrast illumination pattern with a time of flight system.

The pattern of light may be illuminated by an illumination unit that may have at least one (or more) light emitting element (s), e.g., a laser element, a light emitting diode, or the like. Moreover, different light emitting elements may emit different light intensities, therefore, a pattern of light that has high-intensity light areas and low-intensity light areas may be illuminated. Furthermore, the pattern of light may be reflected back from objects within the scene and, for example, a lens collects the light reflected from the scene and forms an image of objects in the scene on the ToF sensor, or the like.

The bright regions for high intensity light areas may be obtained based on the image data, which may include the I and Q values corresponding to the high intensity light areas. For example, a program running on the circuitry of the imaging system may determine the positions of the areas being illuminated by the high-intensity light and may further obtain the bright regions corresponding to the high intensity light areas, as it is generally known to the skilled person in the field of image processing. Moreover, the dark regions for low intensity light areas may be obtained based on the image data, which, may include the I and Q values corresponding to the low intensity light areas. A program running on the circuitry of the device may determine the positions of the areas being illuminated by the low-intensity light and may further obtain the dark regions corresponding to the low intensity light areas, or the like.

The imaging system is advantageous as the simplicity, the linearity (linear responsivity of the system), the robustness is increased and the output of the imaging system can be an input of hazard decision making stage. The simplicity in the context of SPOT-TOF is increased, because no big post processing is needed.

According to the first embodiments, the circuitry is configured to calculate an intensity ratio based on the image information related to the bright regions and the image information related to the dark regions.

According to the first embodiments, the circuitry is configured to determine if atmospheric aerosol particles are present.

According to the first embodiments, the imaging system comprises circuitry configured to illuminate the scene with patterned light. The circuitry may be a number of LEDs or laser diodes, in particular vertical-cavity surface-emitting lasers (VCSELs). The light emitted by the illumination units may be modulated with high speeds, e.g. from 200 MHz up to 300 MHz. The emitted light may be an infrared light to make the illumination unobtrusive.

According to the first embodiments, the patterned light comprises high-intensity light areas and low-intensity light areas.

According to the first embodiments, the circuitry is further configured to determine intensity information of the image data for each pixel of the image.

According to the first embodiments, the circuitry is further configured to apply a local-maxima filter on the image information to identify the bright regions. The local-maxima filter may be applied on the intensity map with a kernel size related to the distance between birth regions (dots areas), and the positions corresponding to the birth regions (i.e. the high intensity light areas) may be obtained.

According to the first embodiments, the circuitry is further configured to apply a local-minima filter on the image information to identify the dark regions. The positions of the dark regions (valleys areas) may be obtained based on applying the local-minima filter on the intensity map with a kernel size related to the distance between birth regions and the size of the birth regions, or the like.

According to the first embodiments, the image information related to the bright regions and the image information related to the dark regions comprises intensity information. The intensity value may be a value determined based i.e. the distribution and type of pixels, offset data, gain data, and auxiliary information.

According to the first embodiments, the circuitry is further configured to determine regions of interest within the image data and to relate, for each region of interest, image information related to the bright regions to image information related to the dark regions in order to determine characteristics of atmospheric aerosol particles.

The embodiments also disclose a method to obtain image data of a scene that is illuminated with patterned light, determine bright regions and dark regions based on the image data, relate image information related to the bright regions to image information related to the dark regions in order to determine characteristics of atmospheric aerosol particles. The methods as described herein may also be implemented in some embodiments as a computer program causing a computer and/or a processor to perform the method, when being carried out on the computer and/or processor.

The second embodiments described below provide an imaging system comprising circuitry configured to obtain a first image data of a scene that is illuminated with patterned light and a second image data of a scene that is illuminated with patterned light and compare the first image data with the second image data in order to determine characteristics of atmospheric precipitation particles.

The atmospheric precipitation particles may be e e.g. rain, snow, etc. The atmospheric precipitation particles may deteriorate the performance of sensing and imaging systems particularly Time-Of-Flight (ToF) systems.

According to the second embodiments, the circuitry is configured to obtain a motion vector field based by comparing the first image data with the second image data.

According to the second embodiments, the circuitry is further configured to determine an average velocity and average direction angel of the motion vectors of the motion vector field and configured to compare the average velocity with a threshold velocity and the average direction angel of the motion vectors with a threshold angle.

According to the second embodiments, the circuitry is configured to determine precipitation articles are present.

According to the second embodiments, the imaging system comprises circuitry configured to illuminate the scene with patterned light.

According to the second embodiments, the patterned light comprises high-intensity light areas and low-intensity light areas.

According to the second embodiments, the circuitry is further configured to determine intensity information of the image data for each pixel of the image.

According to the second embodiments, the circuitry is further configured to apply a local-maxima filter on the image information to identify the bright regions.

According to the second embodiments, the circuitry is further configured to apply a local-minima filter on the image information to identify the dark regions.

According to the second embodiments, the image information related to the bright regions and the image information related to the dark regions comprises intensity information.

According to the second embodiments, the circuitry is further configured to determine regions of interest within the image data and to compare, for each region of interest, the first image data with the second image data in order to determine characteristics of atmospheric precipitation particles.

According to the second embodiments, the circuitry is further configured to obtain the first image data (n) and the second image data based on the bright regions. Alternately, for example, dark regions or both dark and bright regions are used or determining a distortion of atmospheric particles AP The embodiments also disclose a method to obtain a first image data of a scene that is illuminated with patterned light and a second image data of a scene that is illuminated with patterned light, and compare the first image data with the second image data in order to determine characteristics of atmospheric precipitation particles.

The embodiments also disclose a time of flight camera comprising the imaging system of the first embodiments and the imaging system of the second embodiments. The system of the first embodiment and second embodiment may for example be a system for a time of flight camera which is a range imaging camera that determines the distance of objects measuring the time of flight (ToF) of a light signal between the camera and the object for each point of the image. For example, an indirect time of flight camera (iToF) measures a phase delay which results from a correlation of the illumination signal with a reference signal.

FIG. 1 illustrates an embodiment of the basic operational principle of a time-of-flight (ToF) system that uses patterned light ("structured light"). The ToF system 1 includes an illumination unit 2 and an imaging sensor 4. The ToF system 1 captures 3D images of a scene 3 by analyzing the time-of-flight of light. A scene 3 is actively illuminated, using the illumination unit 2, with a patterned light PL that is modulated at a predetermined wavelength, for instance with some light pulses of at least one predetermined frequency generated by a timing generator (not shown in FIG. 1). The patterned light PL has a high-frequency and a high-contrast illumination pattern. More specifically, the patterned light PL includes high-intensity light areas 5 and low-intensity light areas 6. The high-intensity light areas 5 are in a form of a multiple dots pattern that impose a sparse sampling grid on the scene 3. The low-intensity light areas 6 are, for example, (intermediary) areas and/or the valleys between dots that have a different light intensity from the dots, e.g., the pattern of light is designed to include the high-intensity dots and some flooding light in the areas surrounding the dots. The patterned light PL is reflected back from objects 7, 8 within the scene 3 and forms an image of the objects 7, 8 onto the imaging sensor 4. The imaging sensor 4 produces a fixed number of frames (image data) per unit of time. Each of these frames may contain position and intensity information. The frames include bright regions and dark regions, the bright regions are the pixel areas that receive reflected light based on the high-intensity light areas 5 and the dark regions are the pixel areas that receive reflected light based on the low-intensity light areas 6. The frames obtained by the imaging sensor 4 may for example comprise four correlation phases, e.g. phase I (0°), phase Q (90°), phase Ib (180°), and phase Qb (270°), where phases Q/Qb exhibit a phase lag of 90° relative to signals I/Ib, respectively, and may be described as being (relatively) in quadrature. Depending on the distance of objects 7, 8 from the ToF system 1, a delay is experienced between the emission of the modulated light (patterned light) PL, e.g. the so-called light pulses, and the reception at the imaging sensor 4 of those reflected light pulses RL. Distances between reflecting objects 7, 8 and the ToF system 1 may be determined as function of the time delay observed and the speed of light constant value.

Figure 2:
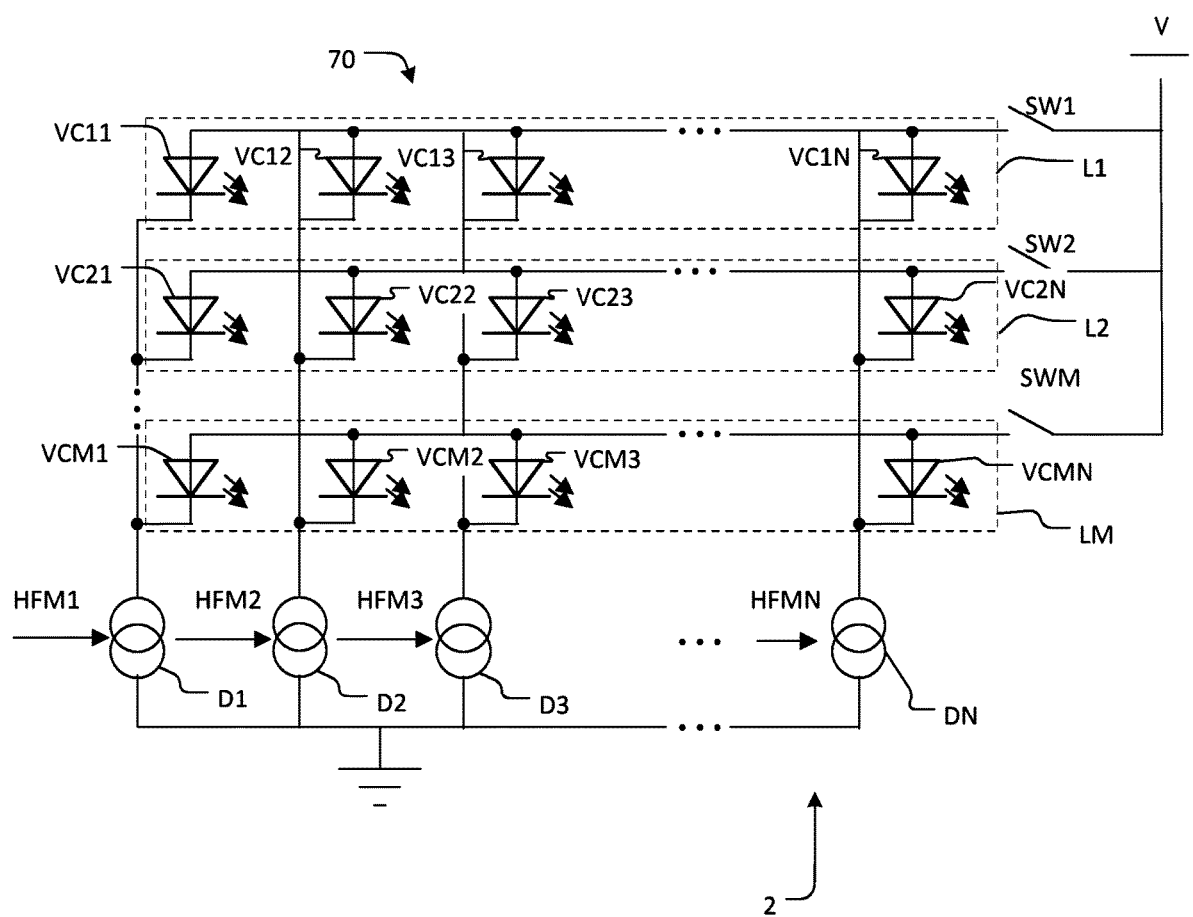
FIG. 2 schematically illustrates an embodiment of the illumination unit of the time-of-flight (ToF) system of FIG. 1.

FIG. 2 schematically illustrates an embodiment of the illumination unit of the time-of-flight (ToF) system of FIG. 1. The illumination unit 2 comprises an illuminator array 70, column drivers D1, D2, D3, . . . , DN and row enable switches SW1, SW2, . . . , SWM for patterned light illuminator. The illuminator array 70 comprises illuminators VC1N-VCMN which are grouped in M sub-sets L1-LM, N drivers D1, D2, DN for driving the illuminator array 70, and M switches SW1-SWM, where N and M may for example be a number between 2 to 16 or any other number. Each illuminators VC1N-VCMN may have an illumination power of 2 W to 10 W. In this embodiment the sub-sets L1-LM are the rows of the VCSEL array. The VCSELs VC11, VC12, . . . , VC1N, VC14 of the first sub-set L1 are grouped in the first electrical line zone. The VCSELs VC21, VC22, VC23, . . . , VC2N of the second sub-set L2 are grouped in the second electrical line zone. The VCSELs VC31, VC32, VC33, . . . , VC3N of the Mth sub-set LM are grouped in the third electrical line zone. Each electrical line zone is electrically connected to the respective driver D1, D2, DN and via the respective switches SW1-SWM to a supply voltage V. The supply voltage V supplies the power for generating a driving current, where the driving current is the current that is applied to the drivers D1, D2, . . . , DN and to the illuminator array 70 by turning on/off the respective switch SW1-SWM. Each driver D1, D2, DN receives a respective high modulation frequency signal HFM1, HFM2, . . . , HFMN to drive the illuminators VC1N-VCMN. Each controllable VCSELs VC11, VC12, VC1N, VC14 of the illuminator array 70 forms a spot beam which contributes to the high-intensity light areas (5 in FIG. 1), where the spot beams are not overlapping as shown in FIG. 1.

Detection of Atmospheric Aerosols Particles (e.g. Fog, Mist, Dust Etc.)

Figure 3:
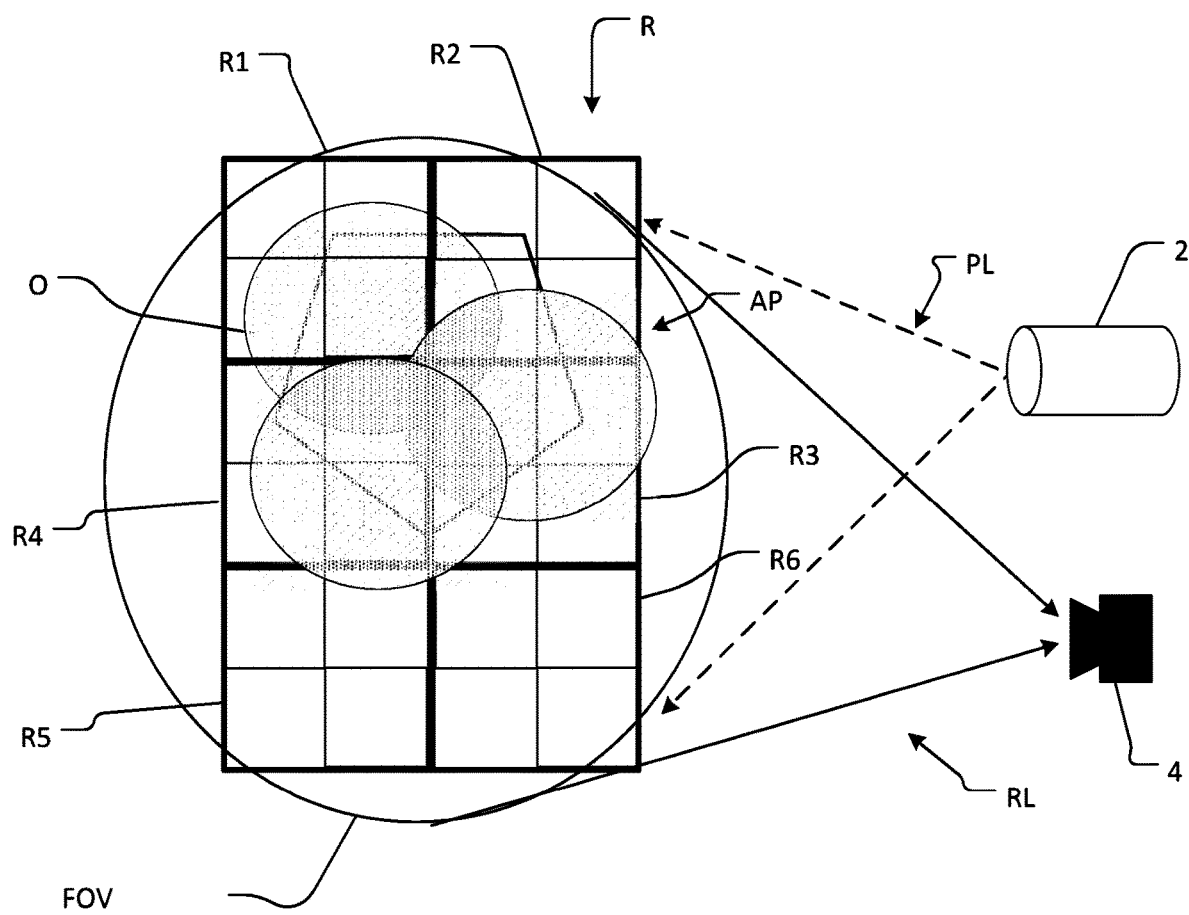
FIG. 3 illustrates an embodiment in which atmospheric aerosols particles which are indicative of fog, mist, dust etc. are detected within a light path between an object and a time-of-flight (ToF) system.

FIG. 3 illustrates an embodiment in which atmospheric aerosols particles which are indicative of fog, mist, dust etc. are detected within a light path between an object and a time-of-flight (ToF) system. A field of view FOV (field of illumination) is illuminated by an illumination unit 2 with patterned light PL. The object O and the atmospheric particles AP are present in this field of view FOV. The atmospheric aerosols particles may be e.g. fog, mist, dust etc. The patterned light PL is reflected by the object O and the reflected light RL is obtained by an imaging sensor 4. Based on the obtained reflected light RL image data is generated. A region of interest (ROI) R is detected from the image data. The detection of region of interest may be based on image binarization (foreground and background), statistical approaches or machine learning. For example, the region of interest can also be set based on cut-off value(s) separating specific pixel intensities from each other. The region of interest R is divided in six sub region of interest (sub-ROI) R1, R2, R3, R4, R5 and R6. Each sub-ROI R1 to R6 comprises two bright regions and two dark regions, the bright regions are the pixel areas that receive reflected light based on high-intensity light areas (5 in FIG. 1) and the dark regions are the pixel areas that receive reflected light based on the low-intensity light areas (6 in FIG. 1). It should be noted that FIG. 3 is a schematic representation in which, in order to avoid a three-dimensional drawing, the imaging sensor 4 and the illumination unit 2 are schematically shown in the same plane as the field of view FOV and on the right of the field of view FOV, whereas actually those units are located outside of the drawing plane and in front of the field of view FOV.

Figure 4:
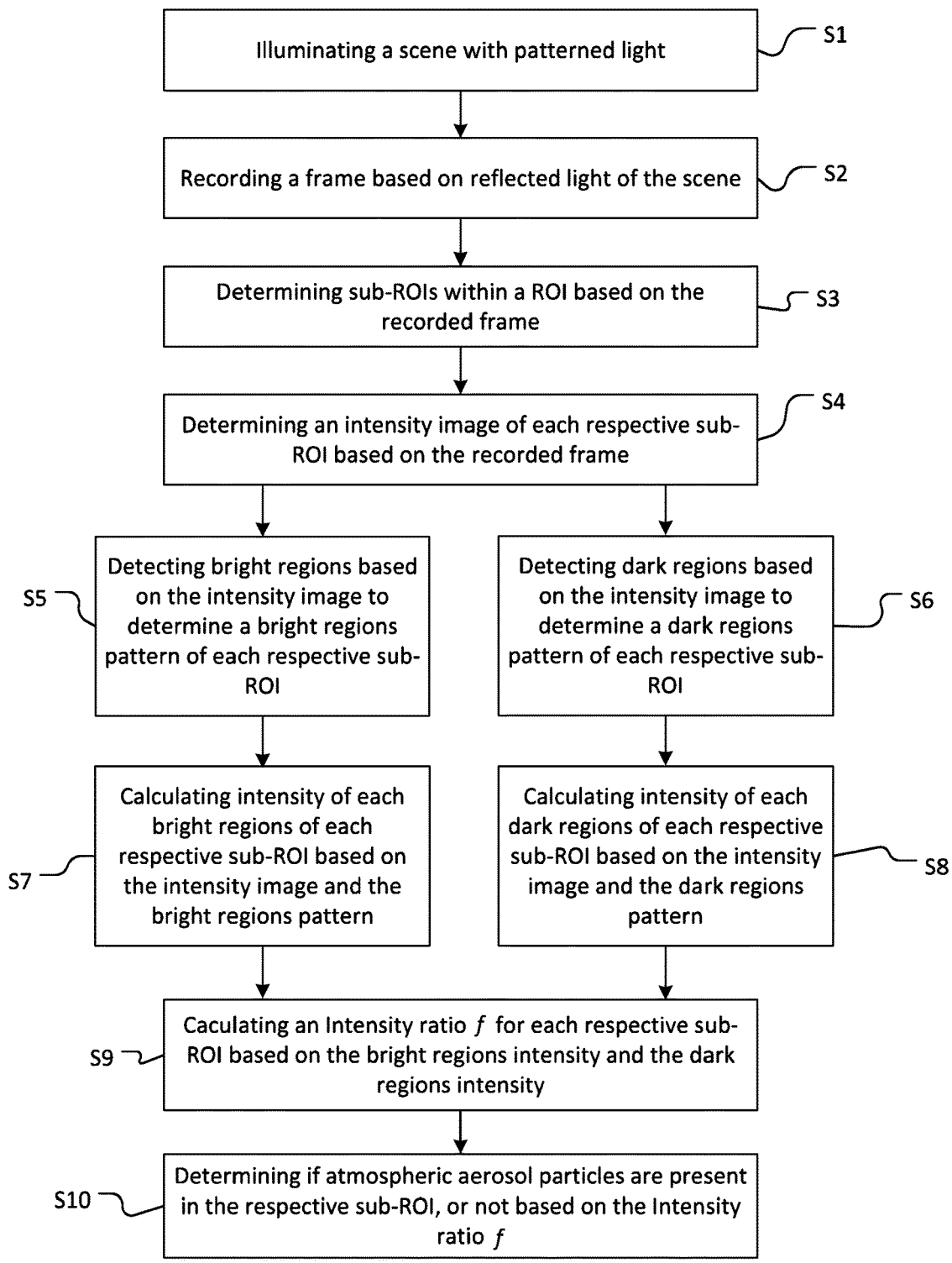
FIG. 4 illustrates a flow diagram of an embodiment of a process of detection of atmospheric aerosols particles which is based on an intensity evaluation and comparison of dark and bright regions.

FIG. 4 illustrates a flow diagram of an embodiment of a process of detection of atmospheric aerosols particles which is based on an intensity evaluation and comparison of dark and bright regions. At S1, a scene is illuminated with a patterned light (PL in FIG. 1) by means of an illumination unit (2 in FIG. 1). At S2, a frame (image data) is recorded based on the reflected light of the scene by means of an imaging sensor (4 in FIG. 1). For example, for each pixel quadrate components, I (real part) and Q (imaginary part), are determined and recorded. At S3, a plurality of sub regions of interest (sub-ROIs) within a region of interest (ROI) on the imaging sensor 4 of FIG. 1 are determined based on the recorded frame. The determination of the sub-ROIs may be based on methods which find pixels that share significant optical features with the target and aggregate them to form ROIs (Feature-based methods). At S4, an intensity image of each respective sub-ROI is determined based on the frame recorded at S2. The intensity image of a respective sub-ROI on the imaging sensor may for example be determined by obtaining the intensity of each pixel of the recorded frame within the sub-ROI. In the context of time of flight, the intensity of pixels is for example obtained according to the following function:

$$\text{Intensity}=|I|+|Q| \qquad \text{(Eq. 1)},$$

where I (real part) and Q (imaginary part) are the quadrate component of the frame. This intensity is an indicator of the amplitude of the signal received in each respective sub-ROI. At S5, bright regions $x_i$ in each respective sub-ROI are detected based on the intensity image determined at S4 in order to determine a bright regions pattern. A local-maxima filter may be applied on the intensity map with a kernel size related to the distance between bright regions. At S6, dark regions $y_j$ in each respective sub-ROI are detected based on the intensity image determined at S4 in order to determine a dark regions pattern. A local-minima filter may be applied on the intensity map with a kernel size related to the distance between dark regions, and the positions corresponding to the dark regions may be obtained. At S7, the intensity of each bright region $x_i$ of each respective sub-ROI is calculated based on the intensity map obtained at S4 and the bright region pattern obtained at S5. For example, the intensity $I_{x_i}$ of a bright region $x_i$ within the sub-ROI may be calculated by averaging the intensities of the individual pixels within the bright region $x_i$. At S8, the intensity of each dark region $y_j$ of each respective sub-ROI is calculated based on the intensity map obtained at S4 and the dark region pattern obtained at S6. For example, the intensity $I_{y_j}$ of a dark region $y_j$ within the sub-ROI may be calculated by averaging the intensities of the individual pixels within the dark region $y_j$. At S9, an intensity ratio f for each respective sub-ROI is calculated as follows:

$$f = \frac{\sum_i^n |I_{y_i}|/n}{\sum_j^m |I_{x_j}|/m},\qquad\text{(Eq. 2)}$$

where n is the total number of bright regions, m is the total number of dark regions, $I_{x_i}$ is the intensity of the individual bright region obtained at S7, $I_{y_j}$ is the intensity of the individual dark region obtained at S8.

The presence of atmospheric aerosols particles (in particular the size and density of a cluster of atmospheric aerosols particles) increases the intensity function from 0 to 1. At S10, it is determined if atmospheric aerosol particles are present in the respective sub-ROI, or not based on the intensity ratio obtained at S9. For example, for each respective sub-ROI the intensity ratio f is compared with a predetermined threshold value. If the intensity ratio f is higher than the threshold value it is determined for the respective sub-ROI that atmospheric aerosols particles (e.g. fog, mist, dust etc.) have been detected in the respective sub-ROI. This determination may for example be implemented by assigning a "true" value to a respective flag attributed to the respective sub-ROI which is configured to indicate if atmospheric aerosols particles (e.g. fog, mist, dust etc.) have been detected in the respective sub-ROI, or not. Still further, the intensity ratio f might also provide information about the density of the atmospheric precipitation particles in the respective sub-ROI. For example, an artificial neural network may be trained to perform this recognition process based on training data obtained during an experimental training setup where intensity ratio f is obtained in situations where the presence, type, and/or density of the atmospheric aerosols particles within the field of view is known.

Figure 5:
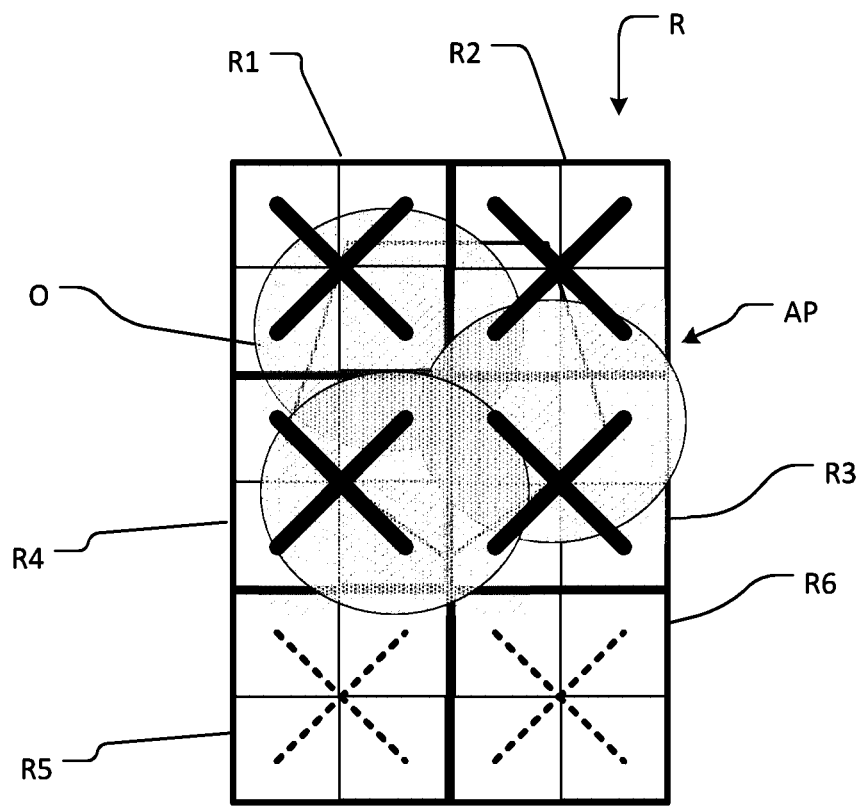
FIG. 5 illustrates an embodiment in which information which indicates if atmospheric aerosols particles (e.g. fog, mist, dust etc.) have been detected in a respective sub-ROI is assigned to sub-ROIs of a recorded frame.

FIG. 5 illustrates an embodiment in which information which indicates if atmospheric aerosols particles (e.g. fog, mist, dust etc.) have been detected in a respective sub-ROI is assigned to sub-ROIs of a recorded frame. For each sub-ROI R1, R2, R3, R4, R5 and R6 in FIG. 5 a solid cross indicates that in the respective sub-ROI atmospheric aerosols particles (e.g. fog, mist, dust etc.) have been detected, and a dashed cross indicates that in the respective sub-ROI atmospheric aerosols particles (e.g. fog, mist, dust etc.) have not been detected.

For example, a Direct and Global Separation (DGS) algorithm can be applied in a further stage to enhance the depth map information of the object affected by atmospheric particles.

Figure 6:
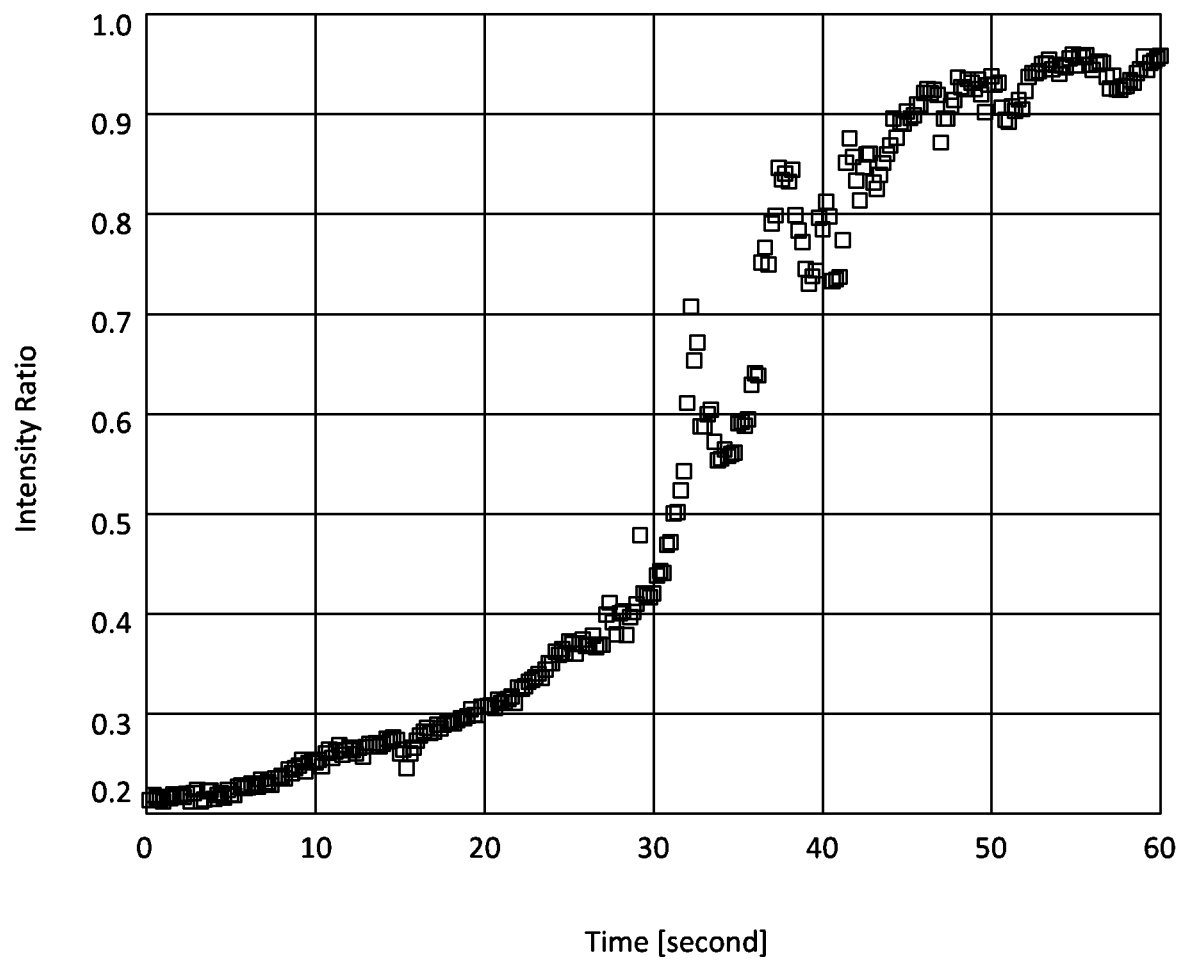
FIG. 6 illustrates as an embodiment a graph which displays an exemplifying result of a determination of the intensity ratio f over time for a ROI.

FIG. 6 illustrates a graph which displays an exemplifying result of an experimental determination of the intensity ratio f over time for a region of interest (ROI) as determined at S9 of FIG. 4. The abscissa represents the time in seconds and the ordinate represents the measured intensity ratio f which relates the intensity measured in the bright regions ("dots") to the intensity in the dark regions ("valleys") in the interval between zero and one. As can be seen in the graph of FIG. 6, the density of atmospheric aerosols particles increases over time and the intensity ratio f increases sigmoidal over time.

FIGS. 7A to 7F illustrate, for multiple time instances T=10, 20, 30, 40, 50, and 60 seconds of the experimental measurement displayed in graph of FIG. 6, a respective intensity image, a corresponding detection map that indicates whether or not atmospheric aerosols particles (e.g. fog, mist, dust etc.) have been detected in ROIs, and an external 2D image of the same scene that has been acquired with an RGB camera. That is, the density of atmospheric aerosols particles is increasing from FIG. 7A to FIG. 7F.

Figure 7A:
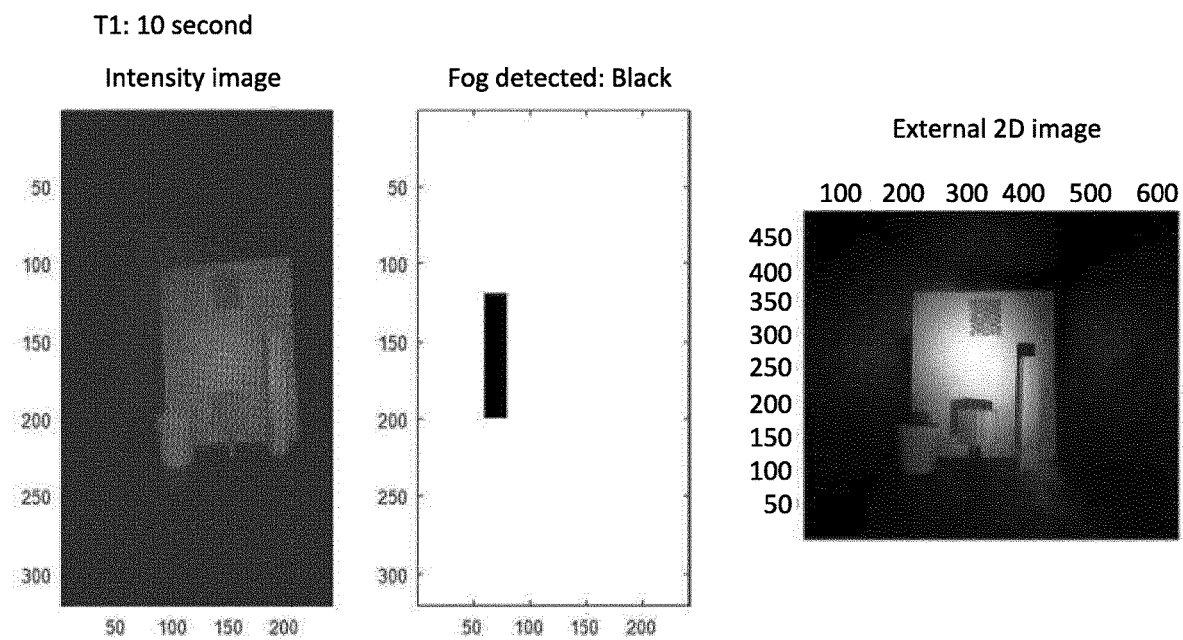
FIG. 7A illustrates as an embodiment an intensity image, an external 2D image and an information map in which black patterns indicates if atmospheric aerosols particles (e.g. fog, mist, dust etc.) have been detected at the time T1 (time of 10 seconds of the graph of FIG. 6)

FIG. 7A relates to time instance T=10 seconds, where the density of atmospheric aerosols particles is low. The intensity image relates to a field of view (FOV) illuminated by patterned light and measured with a time of flight camera. The FOV of the time of flight camera is considered here as a region of interest ROI. The abscissa of the intensity image represents 240 horizontal pixels and the ordinate of the intensity image represents 320 vertical pixels of the time of flight camera. The intensity image displays for each pixel the intensity value:

$$\text{Intensity}=|I|+|Q|\qquad\text{(Eq. 3)},$$

where I (real part) and Q (imaginary part) are the quadrate component of the frame as measured for each respective pixel. The ROI of the time of flight camera is divided into sub-ROIs (see S3 of FIG. 4), where each sub-ROI corresponds to an area of 20×20 pixels. FIG. 7A further shows a corresponding detection map which indicates whether or not atmospheric aerosols particles (e.g. fog, mist, dust etc.) have been detected in the respective sub-ROIs (see S11 in FIG. 4). A black rectangle indicates that atmospheric aerosols particles have been detected in the respective sub-ROI (see solid cross in FIG. 5), a white square indicates that no atmospheric aerosols particles have been detected in the respective sub-ROI (see dashed cross in FIG. 5). Still further in FIG. 7A, an external 2D image displays, as a grayscale image, a field of view (FOV) of 640 horizontal pixels and 480 vertical pixels of the RGB camera. Three objects in front of a wall can be identified in the intensity image as well as in the external 2D image. Still further, the use of patterned light is reflected in the intensity image which shows a pattern of bright regions and dark regions. As at T=10 seconds the density of the atmospheric aerosols particles is low, the external 2D image shows sharp contours of the objects within the field of view. Accordingly, the detection map shows only a small number of four sub-ROIs (black rectangles) where atmospheric aerosols particles have been detected. No atmospheric aerosols particles are detected in the remaining sub-ROIs.

Figure 7B:
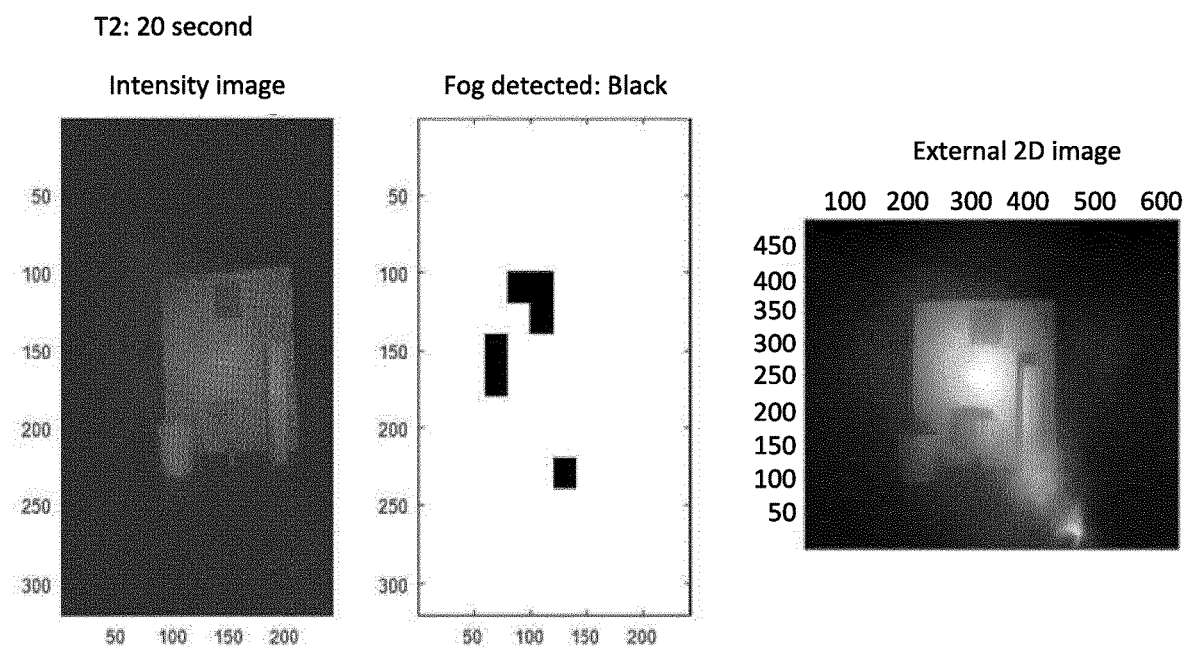
FIG. 7B illustrates as an embodiment an intensity image, an external 2D image and an information map in which black patterns indicates if atmospheric aerosols particles (e.g. fog, mist, dust etc.) have been detected at the time T2 (time of 20 seconds of the graph of FIG. 6)

FIG. 7B relates to time instance T=20 seconds, where the density of atmospheric aerosols particles is increased compared to the time T=10 seconds. As can be seen in the external 2D image, due to the increased presence of atmospheric aerosols particles at T=20 seconds, the contours of the objects within the field of view as captured by the RGB camera are less sharp than at T=10 seconds. Accordingly, the number of sub-ROIs (black rectangles) where atmospheric aerosols particles have been detected has increased.

Figure 7C:
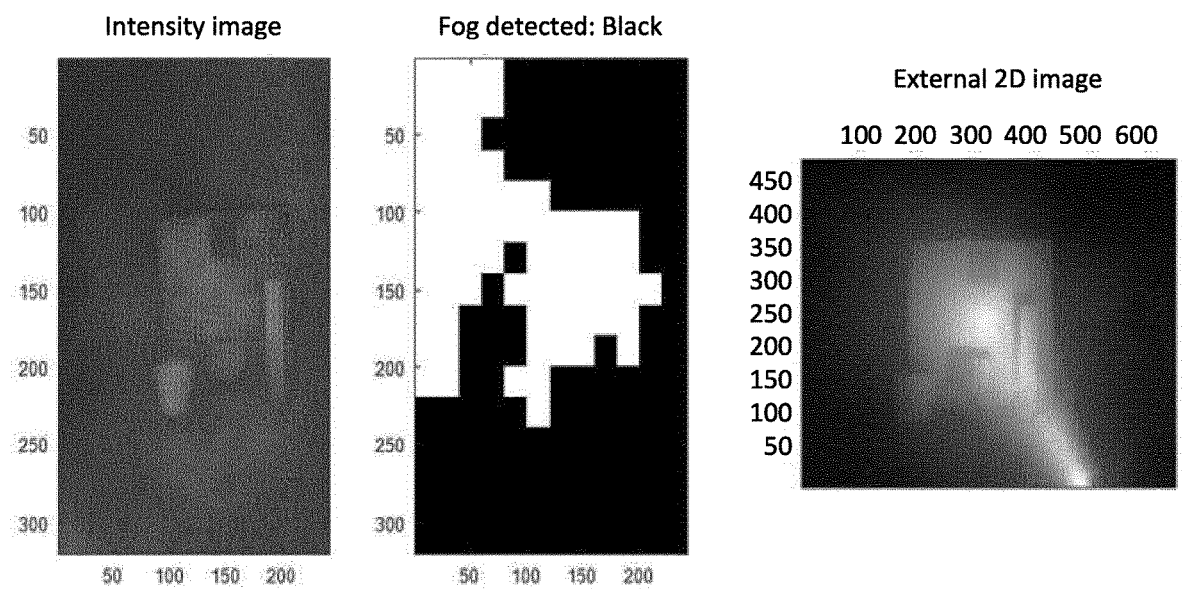
FIG. 7C illustrates as an embodiment an intensity image, an external 2D image and an information map in which black patterns indicates if atmospheric aerosols particles (e.g. fog, mist, dust etc.) have been detected at the time T3 (time of 30 seconds of the graph of FIG. 6)

FIG. 7C relates to time instance T=30 seconds, where the density of atmospheric aerosols particles is increased compared to the time T=20 seconds. As can be seen in the external 2D image, due to the increased presence of atmospheric aerosols particles at T=30 seconds, the contours of the three objects within the field of view as captured by the RGB camera are hardly visible. Accordingly, the number of sub-ROIs (black rectangles) where atmospheric aerosols particles have been detected has increased.

Figure 7D:
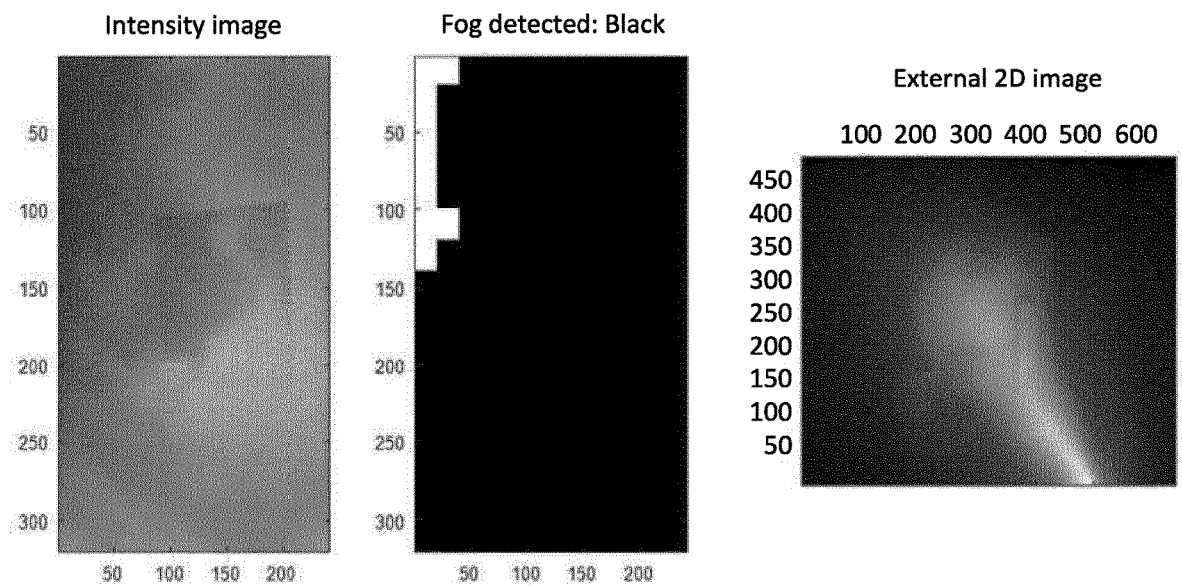
FIG. 7D illustrates as an embodiment an intensity image, an external 2D image and an information map in which black patterns indicates if atmospheric aerosols particles (e.g. fog, mist, dust etc.) have been detected at the time T4 (time of 40 seconds of the graph of FIG. 6)

FIG. 7D relates to time instance T=40 seconds, where the density of atmospheric aerosols particles is increased compared to the time T=30 seconds. As can be seen in the external 2D image, due to the increased presence of atmospheric aerosols particles at T=40 seconds, only the contours of two objects within the field of view as captured by the RGB camera are still visible. Accordingly, the number of sub-ROIs (black rectangles) where atmospheric aerosols particles have been detected has increased even more.

Figure 7E:
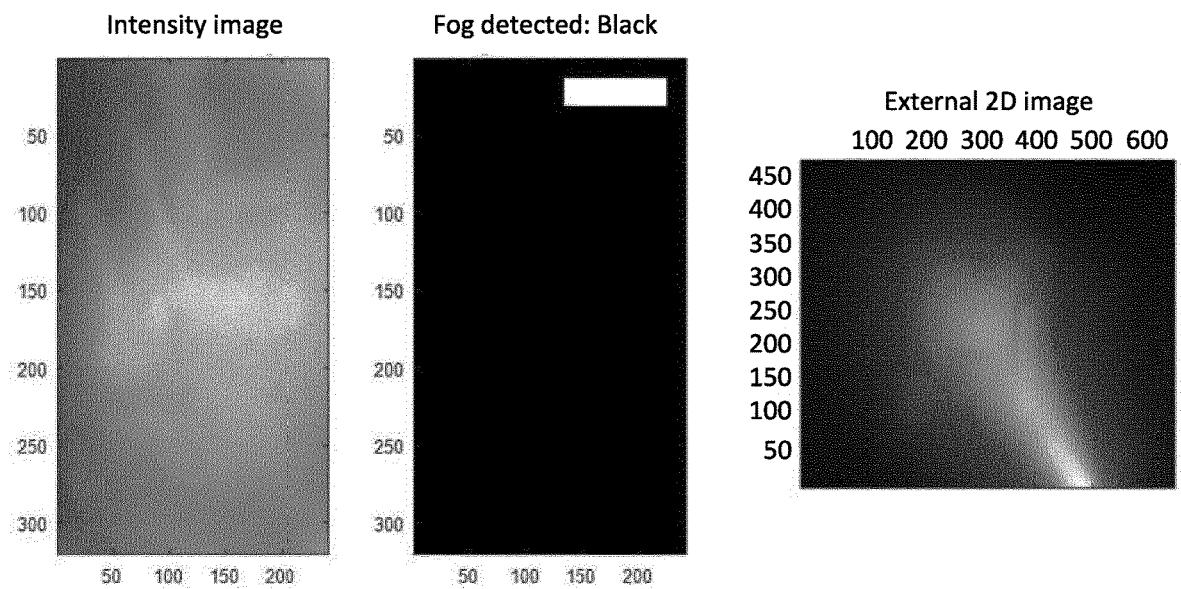
FIG. 7E illustrates as an embodiment an intensity image, an external 2D image and an information map in which black patterns indicates if atmospheric aerosols particles (e.g. fog, mist, dust etc.) have been detected at the time T5 (time of 50 seconds of the graph of FIG. 6)

FIG. 7E relates to time instance T=50 seconds, where the density of atmospheric aerosols particles is increased compared to the time T=40 seconds. As can be seen in the external 2D image, due to the increased presence of atmospheric aerosols particles at T=50 seconds, the contours of the objects within the field of view as captured by the RGB camera are even less sharp than at T=40 seconds. Accordingly, the number of sub-ROIs (black rectangles) where atmospheric aerosols particles have been detected has increased even more and only four sub-ROIs indicate that no atmospheric aerosols particles have been detected.

Figure 7F:
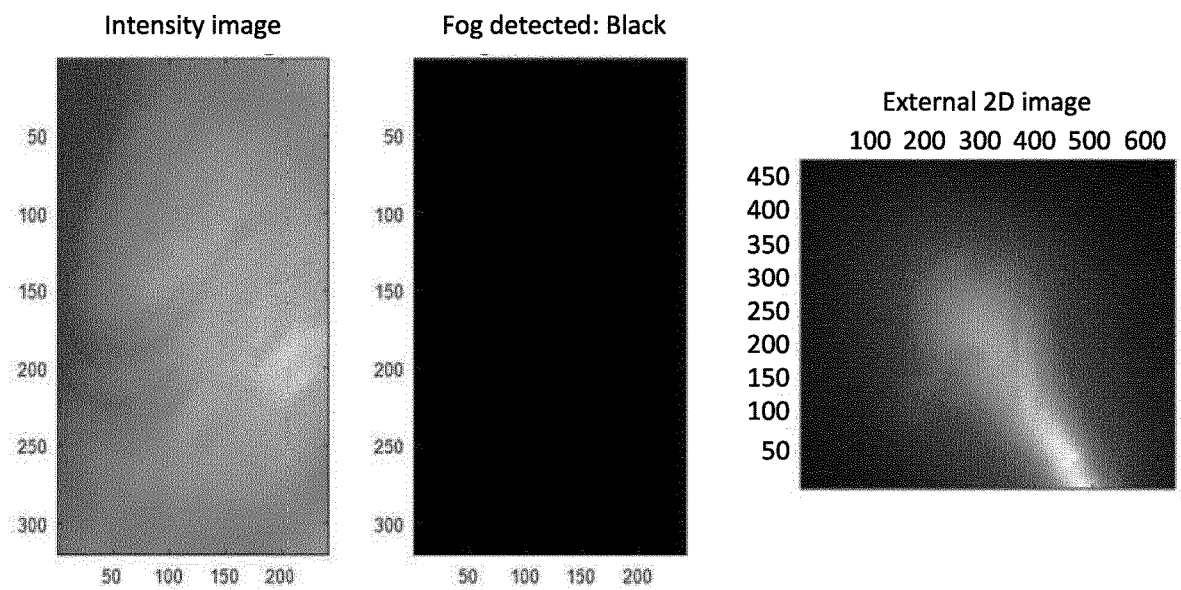
FIG. 7F illustrates as an embodiment an intensity image, an external 2D image and an information map in which black patterns indicates if atmospheric aerosols particles (e.g. fog, mist, dust etc.) have been detected at the time T6 (time of 60 seconds of the graph of FIG. 6).

FIG. 7F relates to time instance T=60 seconds, where the density of atmospheric aerosols particles is even more increased compared to the time T=50 seconds. As can be seen in the external 2D image, due to the increased presence of atmospheric aerosols particles at T=60 seconds, the contours of the objects within the field of view as captured by the RGB camera are even less sharp than at T=50 seconds. Accordingly, in all sub-ROIs of the FOV atmospheric aerosols particles have been detected (black rectangles throughout the complete map).

Detection of Atmospheric Precipitation Particles (e.g. Rain, Snow, Etc.)

Figure 8:
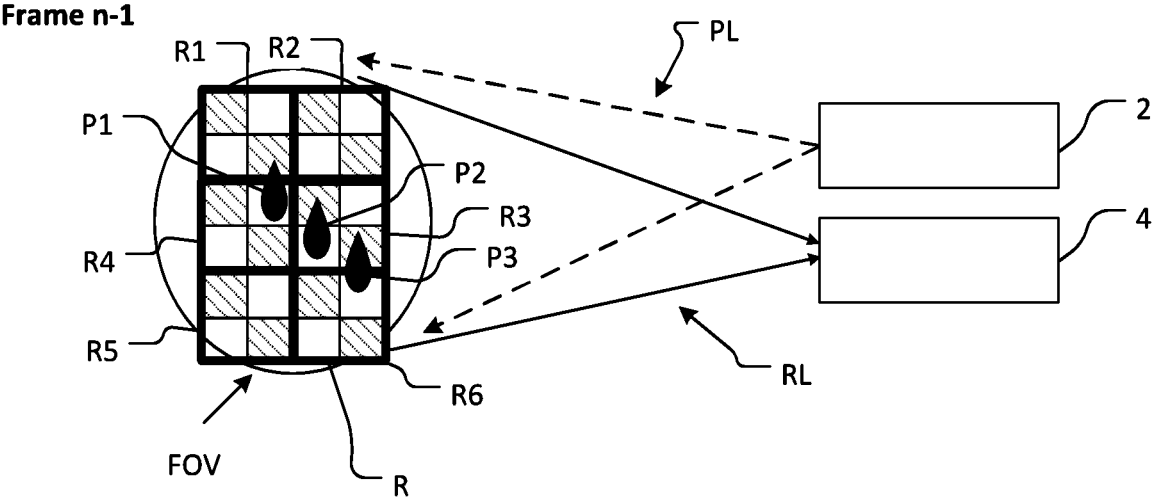
FIG. 8 schematically illustrates an embodiment in which atmospheric precipitation particles which are indicative of e.g. rain, snow, etc. are detected within a light path between an object and a time-of-flight (ToF) system.
Figure 8:
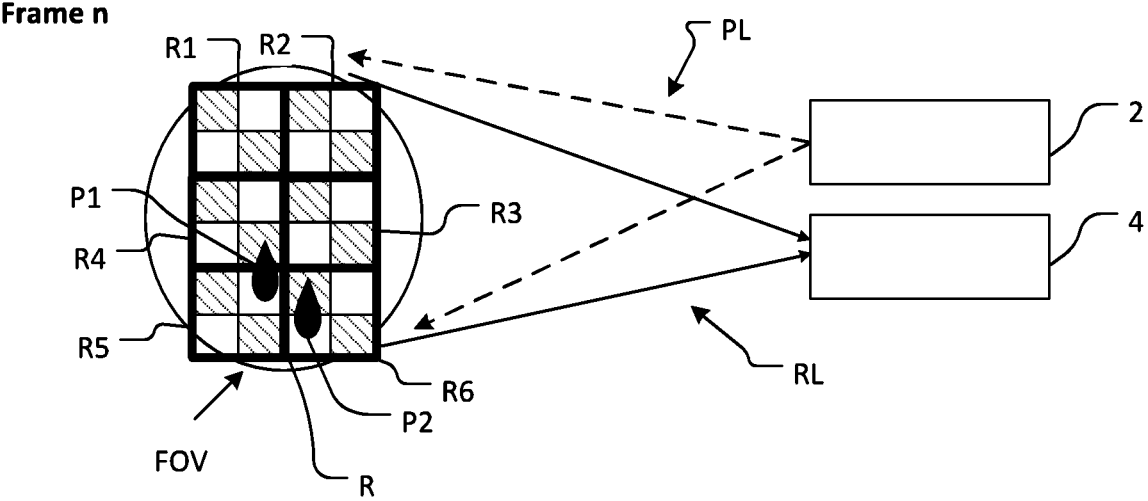

FIG. 8 schematically illustrates an embodiment in which atmospheric precipitation particles which are indicative of e.g. rain, snow, etc. are detected within a light path between an object and a time-of-flight (ToF) system. At a first time instance, the field of view FOV with three exemplary atmospheric precipitation particles P1, P2 and P3, here raindrops, is illuminated by an illumination unit 2 with patterned light PL and a first frame n−1 is captured. The patterned light PL is reflected by the atmospheric precipitation particles P1, P2 and P3 and the reflected light RL is captured by an imaging sensor 4. Based on the reflected light RL a first distortion image (frame n−1) is generated. A region of interest (ROI) R is detected from the first distortion image data. The detection of region of interest may be based on image binarization (foreground and background), statistical approaches or machine learning. For example, the region of interest can also be set based on cut-off value(s) separating specific pixel intensities from each other. The region of interest R is divided in six sub region of interest (sub-ROI) R1, R2, R3, R4, R5 and R6. Each sub-ROI R1 to R6 comprises two bright regions and two dark regions, the bright regions are the pixel areas that receive reflected light based on high-intensity light areas (5 in FIG. 1) and the dark regions are the pixel areas that receive reflected light based on the low-intensity light areas (6 in FIG. 1). At the first time instance, the first atmospheric precipitation particle P1 is detected in the upper bright region of the sub-ROI R4, the second atmospheric precipitation particle P2 is detected in the lower bright region of the sub-ROI R3, and the third atmospheric precipitation particle P3 is detected in the upper bright region of the sub-ROI R6. At a second time instance, the field of view FOV is again illuminated by the illumination unit 2 with patterned light PL and a second distortion image data (frame n) is generated. At the second time instance, the atmospheric precipitation particles P1, P2 and P3 have moved toward the downside with respect to the first time instance. Therefore, the first atmospheric precipitation particle P1 is detected in the upper bright region of the sub-ROI R5, the second atmospheric precipitation particle P2 is detected in the lower bright region of the sub-ROI R6, and the third atmospheric precipitation particle P3 is outside field of view FOV. The second distortion image data (frame n) is compared with the first distortion image data (frame n−1) to evaluate the local distortion of the atmospheric precipitation particles P1, P2, P3. A more detailed explanation of this distortion check process is given in FIG. 9.

It should be noted that FIG. 8 is a schematic representation in which, in order to avoid a three-dimensional drawing, the imaging sensor 4 and the illumination unit 2 are schematically shown in the same plane as the field of view FOV and on the right of the field of view FOV, whereas actually those units are located outside of the drawing plane and in front of the field of view FOV.

Figure 9:
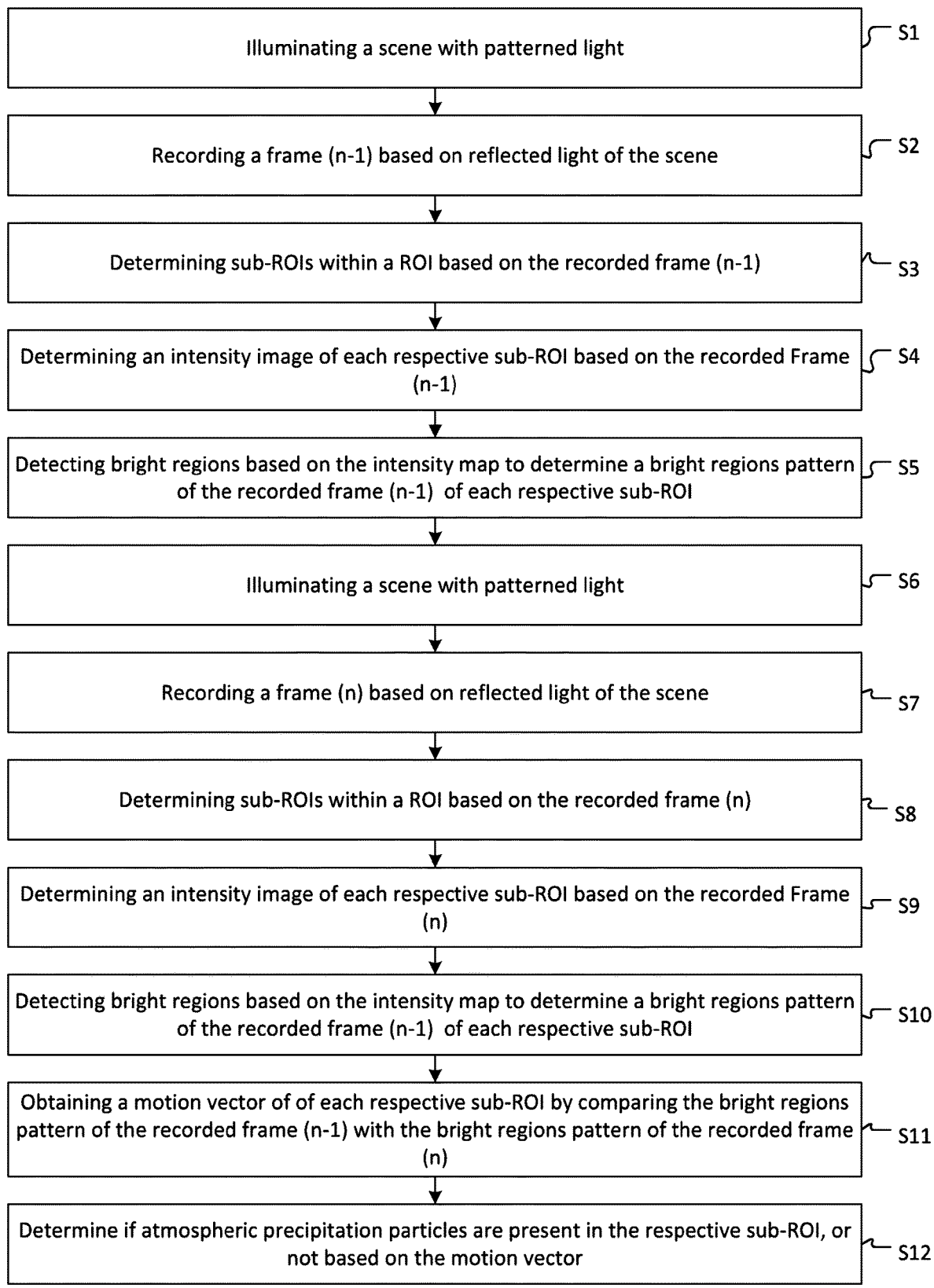
FIG. 9 illustrates a flow diagram of an embodiment of a process of detection of atmospheric precipitation particles which is based on an intensity evaluation and comparison of bright regions.

FIG. 9 illustrates a flow diagram of an embodiment of a process of detection of atmospheric precipitation particles which is based on an intensity evaluation and comparison of bright regions. At S1, a scene is illuminated with a patterned light (PL in FIG. 1) by means of an illumination unit (2 in FIG. 1). At S2, a frame (n−1) is recorded based on the reflected light of the scene by means of an imaging sensor (4 in FIG. 1). For example, for each pixel quadrate components, I (real part) and Q (imaginary part), are determined and recorded. At S3, a plurality of sub regions of interest (sub-ROIs) within a region of interest (ROI) on the imaging sensor 4 of FIG. 1 are determined based on the recorded frame (n−1). The determination of the sub-ROIs may be based on methods which find pixels that share significant optical features with the target and aggregate them to form ROIs (Feature-based methods). At S4, an intensity map of each respective sub-ROI is determined based on the frame recorded (n−1) in S2. The intensity map of a respective sub-ROI on the imaging sensor may for example be determined by obtaining the intensity of each pixel of the recorded frame (n−2). The intensity of pixels is obtained according to the following function:

$$\text{Intensity}=|I|+|Q| \qquad \text{(Eq. 4)},$$

where I (real part) and Q (imaginary part) are the quadrate component of the frame (n−1). This intensity is an indicator of the amplitude of the signal received in each respective sub-ROI. At S5, bright regions $x_i$ of the recorded frame (n−1) in each respective sub-ROI are detected based on the intensity map of the recorded frame (n−1) determined at S4 in order to determine a bright regions pattern. A local-maxima filter may be applied on the intensity map with a kernel size related to the distance between bright regions. At S6, a scene is illuminated with a patterned light (PL in FIG. 1) by means of an illumination unit (2 in FIG. 1). At S7, a frame (n) is recorded based on the reflected light of the scene by means of an imaging sensor (4 in FIG. 1). For example, for each pixel quadrate components, I (real part) and Q (imaginary part), are determined and recorded. At S8, a plurality of sub regions of interest (sub-ROIs) within a region of interest (ROI) on the imaging sensor 4 of FIG. 1 are determined based on the recorded frame (n). The determination of the sub-ROIs may be based on methods which find pixels that share significant optical features with the target and aggregate them to form ROIs (Feature-based methods). At S9, an intensity map of each respective sub-ROI is determined based on the frame recorded (n) at S7. The intensity map of a respective sub-ROI on the imaging sensor may for example be determined by obtaining the intensity of each pixel of the recorded frame (n). The intensity of pixels is obtained according to the following function:

$$\text{Intensity} = |I| + |Q| \qquad \text{(Eq. 5)},$$

where I (real part) and Q (imaginary part) are the quadrate component of the frame (n). This intensity is an indicator of the amplitude of the signal received in each respective sub-ROI. At S10, bright regions $x_i$ of the recorded frame (n) in each respective sub-ROI are detected based on the intensity map of the recorded frame (n) determined at S9 in order to determine a bright regions pattern. A local-maxima filter may be applied on the intensity map with a kernel size related to the distance between bright regions. At S11, a motion vector field of each respective sub-ROI is obtained by comparing the bright regions pattern of the respective sub-ROI of recorded frame (n−1) with the bright regions pattern of the respective sub-ROI of the recorded frame (n). At S12, it is determined if atmospheric precipitation particles are present in the respective sub-ROI, or not based on the motion vector. For example, for each sub-ROI, an average velocity and average direction of the motion vectors of the motion vector field may be determined and this average velocity and average direction of the motion vectors may be used to determine if atmospheric precipitation particles are present in the respective sub-ROI, or not. For example, an angle between the average direction of the motion vectors and the (vertical) downwards direction can be determined, and it is determined that atmospheric precipitation particles are present in the respective sub-ROI, if the average velocity is larger than a threshold velocity and if the angle of the motion vectors with respect to the downwards direction is smaller than a predefined threshold angle. Still further, the type of atmospheric precipitation particles may be inferred from the average velocity and the average direction of the motion vectors. For example, raindrops typically show a larger velocity than snowflakes. Still further, a pattern recognition process may be applied to the motion vector field in order to determine if atmospheric precipitation particles are present in the respective sub-ROI. The pattern recognition process may also indicate the type of atmospheric precipitation particles present in the respective sub-ROI. Still further, the pattern recognition process might also provide information about the density of the atmospheric precipitation particles in the respective sub-ROI. For example, an artificial neural network may be trained to perform this pattern recognition process based on training data obtained during an experimental training setup where motion vector fields are obtained in situations where the presence, type, and/or density of the atmospheric precipitation particles within the field of view is known.

In this embodiment it is shown that only the bright regions are used for determining a distortion of atmospheric precipitation particles, but it is also possible to use dark regions or use both dark and bright regions.

Implementation

The technology according to the embodiments of the present disclosure is applicable to various products. For example, the technology according to an embodiment of the present disclosure may be implemented as a device included in a mobile body that is any of kinds of automobiles, electric vehicles, hybrid electric vehicles, motorcycles, bicycles, personal mobility vehicles, airplanes, drones, ships, robots, construction machinery, agricultural machinery (tractors), Head-Mounted Display (HMD), smart glasses, mobile phone (Smartphone), and the like. Further, the technology according to the embodiments of the present disclosure may be applicable for self-driving vehicles.

Figure 10:
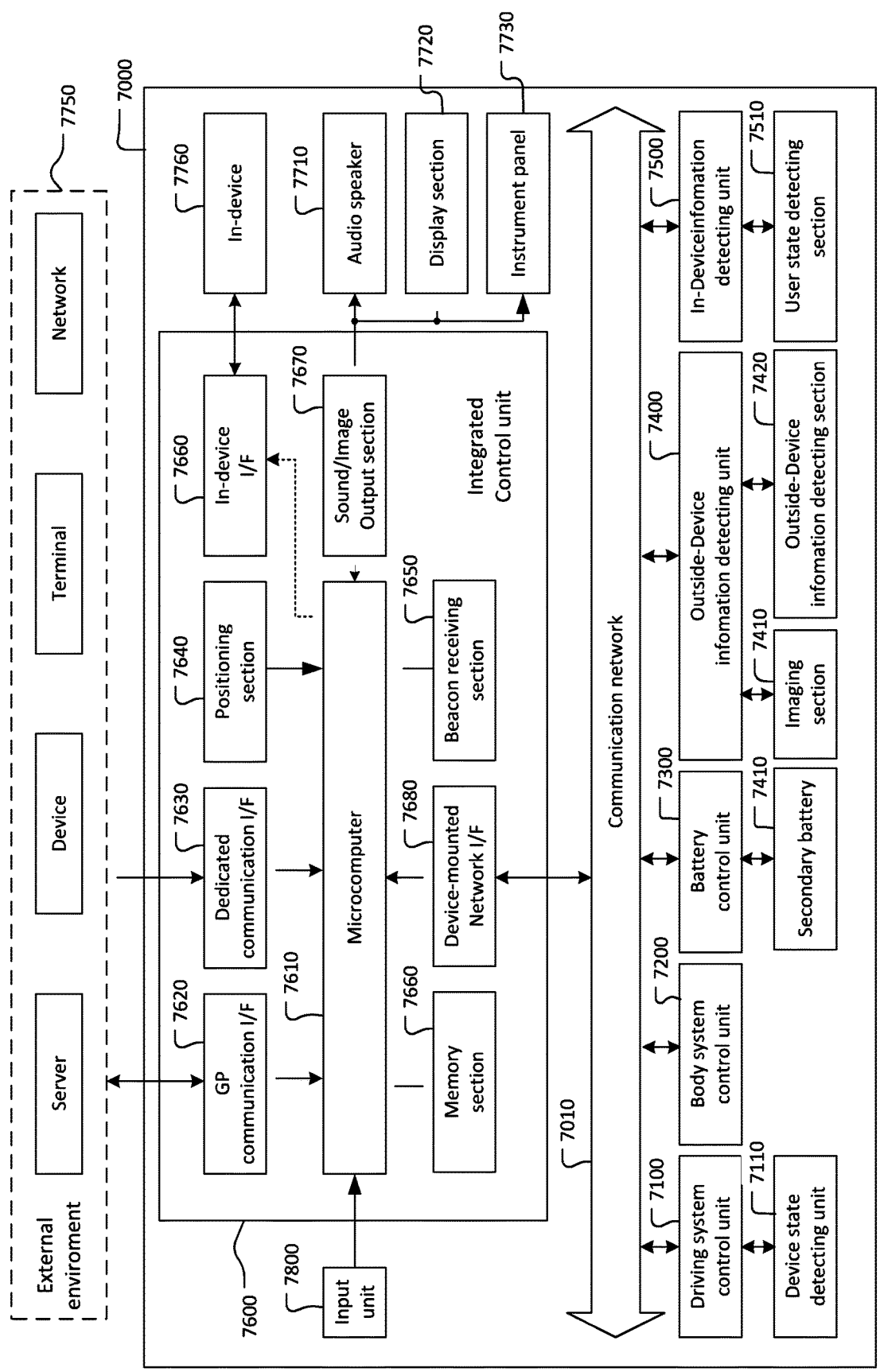
FIG. 10 is a block diagram depicting an example of schematic configuration of a device control system.

FIG. 10 is a block diagram depicting an example of schematic configuration of a device control system 7000 as an example of a mobile body control system to which the technology according to an embodiment of the present disclosure can be applied. The device control system 7000 includes a plurality of electronic control units connected to each other via a communication network 7010. In the example depicted in FIG. 10, the device control system 7000 includes a driving system control unit 7100, a body system control unit 7200, a battery control unit 7300, an outside-device information detecting unit 7400, an in-device information detecting unit 7500, and an integrated control unit 7600. The communication network 7010 connecting the plurality of control units to each other may, for example, be a device-mounted communication network compliant with an arbitrary standard such as controller area network (CAN), local interconnect network (LIN), local area network (LAN), FlexRay (registered trademark), or the like.

Each of the control units includes: a microcomputer that performs arithmetic processing according to various kinds of programs; a storage section that stores the programs executed by the microcomputer, parameters used for various kinds of operations, or the like; and a driving circuit that drives various kinds of control target devices. Each of the control units further includes: a network interface (I/F) for performing communication with other control units via the communication network 7010; and a communication I/F for performing communication with a sensor, or the like within and without the device by wire communication or radio communication. A functional configuration of the integrated control unit 7600 illustrated in FIG. 10 includes a microcomputer 7610, a general-purpose communication I/F 7620, a dedicated communication I/F 7630, a positioning section 7640, a beacon receiving section 7650, an in-device I/F 7660, a sound/image output section 7670, a device-mounted network I/F 7680, and a storage section 7690. The other control units similarly include a microcomputer, a communication I/F, a storage section, and the like.

The driving system control unit 7100 controls the operation of devices related to the driving system of the vehicle in accordance with various kinds of programs. For example, the driving system control unit 7100 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like. The driving system control unit 7100 may have a function as a control device of an antilock brake system (ABS), electronic stability control (ESC), or the like.

The driving system control unit 7100 is connected with a device state detecting section 7110. The vehicle state detecting section 7110, for example, includes at least one of a gyro sensor that detects the angular velocity of axial rotational movement of a vehicle body, an acceleration sensor that detects the acceleration of the vehicle, and sensors for detecting an amount of operation of an accelerator pedal, an amount of operation of a brake pedal, the steering angle of a steering wheel, an engine speed or the rotational speed of wheels, and the like. The driving system control unit 7100 performs arithmetic processing using a signal input from the vehicle state detecting section 7110, and controls the internal combustion engine, the driving motor, an electric power steering device, the brake device, and the like.

The body system control unit 7200 controls the operation of various kinds of devices provided to the vehicle body in accordance with various kinds of programs. For example, the body system control unit 7200 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 7200. The body system control unit 7200 receives these input radio waves or signals, and controls a door lock device, the power window device, the lamps, or the like of the vehicle.

The battery control unit 7300 controls a secondary battery 7310, which is a power supply source for the driving motor, in accordance with various kinds of programs. For example, the battery control unit 7300 is supplied with information about a battery temperature, a battery output voltage, an amount of charge remaining in the battery, or the like from a battery device including the secondary battery 7310. The battery control unit 7300 performs arithmetic processing using these signals, and performs control for regulating the temperature of the secondary battery 7310 or controls a cooling device provided to the battery device or the like.

The outside-vehicle information detecting unit 7400 detects information about the outside of the vehicle including the vehicle control system 7000. For example, the outside-vehicle information detecting unit 7400 is connected with at least one of an imaging section 7410 and an outside-vehicle information detecting section 7420. The imaging section 7410 includes at least one of a time-of-flight (ToF) camera, a stereo camera, a monocular camera, an infrared camera, and other cameras.

The outside-vehicle information detecting section 7420, for example, includes at least one of an environmental sensor for detecting current atmospheric conditions or weather conditions and a peripheral information detecting sensor for detecting another vehicle, an obstacle, a pedestrian, or the like on the periphery of the vehicle including the vehicle control system 7000.

The environmental sensor, for example, may be at least one of a rain drop sensor detecting rain, a fog sensor detecting a fog, a sunshine sensor detecting a degree of sunshine, and a snow sensor detecting a snowfall. The peripheral information detecting sensor may be at least one of an ultrasonic sensor, a radar device, and a LIDAR device (Light detection and Ranging device, or Laser imaging detection and ranging device). Each of the imaging section 7410 and the outside-vehicle information detecting section 7420 may be provided as an independent sensor or device, or may be provided as a device in which a plurality of sensors or devices are integrated.

Figure 11:
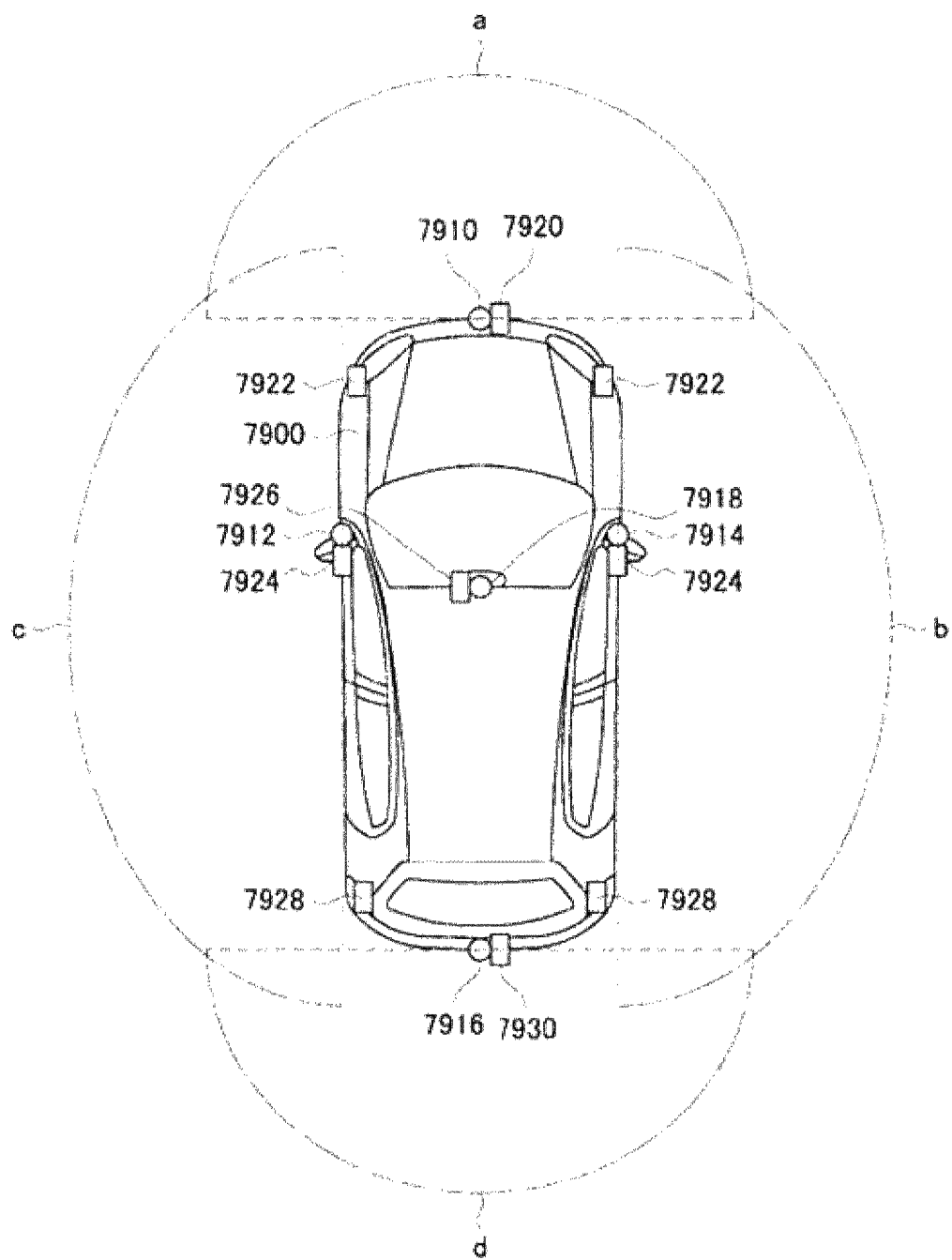
FIG. 11 depicts an example of installation positions of the imaging section and the outside-vehicle device information detecting section, when the device of FIG. 10 is a vehicle.

FIG. 11 depicts an example of installation positions of the imaging section 7410 and the outside-vehicle information detecting section 7420.

Imaging sections 7910, 7912, 7914, 7916, and 7918 are, for example, disposed at least one of positions on a front nose, sideview mirrors, a rear bumper, and a back door of the vehicle 7900 and a position on an upper portion of a windshield within the interior of the vehicle. The imaging section 7910 provided to the front nose and the imaging section 7918 provided to the upper portion of the windshield within the interior of the vehicle obtain mainly an image of the front of the vehicle 7900. The imaging sections 7912 and 7914 provided to the sideview mirrors obtain mainly an image of the sides of the vehicle 7900. The imaging section 7916 provided to the rear bumper or the back door obtains mainly an image of the rear of the vehicle 7900. The imaging section 7918 provided to the upper portion of the windshield within the interior of the vehicle is used mainly to detect a preceding vehicle, a pedestrian, an obstacle, a signal, a traffic sign, a lane, or the like.

Incidentally, FIG. 11 depicts an example of photographing ranges of the respective imaging sections 7910, 7912, 7914, and 7916. An imaging range a represents the imaging range of the imaging section 7910 provided to the front nose. Imaging ranges b and c respectively represent the imaging ranges of the imaging sections 7912 and 7914 provided to the sideview mirrors. An imaging range d represents the imaging range of the imaging section 7916 provided to the rear bumper or the back door. A bird's-eye image of the vehicle 7900 as viewed from above can be obtained by superimposing image data imaged by the imaging sections 7910, 7912, 7914, and 7916, for example.

Outside-vehicle information detecting sections 7920, 7922, 7924, 7926, 7928, and 7930 provided to the front, rear, sides, and corners of the vehicle 7900 and the upper portion of the windshield within the interior of the vehicle may be, for example, an ultrasonic sensor or a radar device. The outside vehicle information detecting sections 7920, 7926, and 7930 provided to the front nose of the vehicle 7900, the rear bumper, the back door of the vehicle 7900, and the upper portion of the windshield within the interior of the vehicle may be a LIDAR device, for example. These outside-vehicle information detecting sections 7920 to 7930 are used mainly to detect a preceding vehicle, a pedestrian, an obstacle, or the like.

Returning to FIG. 10, the description will be continued. The outside-vehicle information detecting unit 7400 makes the imaging section 7410 image an image of the outside of the vehicle, and receives imaged image data. In addition, the outside-vehicle information detecting unit 7400 receives detection information from the outside-vehicle information detecting section 7420 connected to the outside-vehicle information detecting unit 7400. In a case where the outside-vehicle information detecting section 7420 is an ultrasonic sensor, a radar device, or a LIDAR device, the outside-vehicle information detecting unit 7400 transmits an ultrasonic wave, an electromagnetic wave, or the like, and receives information of a received reflected wave. On the basis of the received information, the outside-vehicle information detecting unit 7400 may perform processing of detecting an object such as a human, a vehicle, an obstacle, a sign, a character on a road surface, or the like, or processing of detecting a distance thereto. The outside-vehicle information detecting unit 7400 may perform environment recognition processing of recognizing a rainfall, a fog, road surface conditions, or the like on the basis of the received information. The outside-vehicle information detecting unit 7400 may calculate a distance to an object outside the vehicle on the basis of the received information.

In addition, on the basis of the received image data, the outside-vehicle information detecting unit 7400 may perform image recognition processing of recognizing a human, a vehicle, an obstacle, a sign, a character on a road surface, or the like, or processing of detecting a distance thereto. The outside-vehicle information detecting unit 7400 may subject the received image data to processing such as distortion correction, alignment, or the like, and combine the image data imaged by a plurality of different imaging sections 7410 to generate a bird's-eye image or a panoramic image. The outside-vehicle information detecting unit 7400 may perform viewpoint conversion processing using the image data imaged by the imaging section 7410 including the different imaging parts.

The in-vehicle information detecting unit 7500 detects information about the inside of the vehicle. The in-vehicle information detecting unit 7500 is, for example, connected with a driver state detecting section 7510 that detects the state of a driver. The driver state detecting section 7510 may include a camera that images the driver, a biosensor that detects biological information of the driver, a microphone that collects sound within the interior of the vehicle, or the like. The biosensor is, for example, disposed in a seat surface, the steering wheel, or the like, and detects biological information of an occupant sitting in a seat or the driver holding the steering wheel. On the basis of detection information input from the driver state detecting section 7510, the in-vehicle information detecting unit 7500 may calculate a degree of fatigue of the driver or a degree of concentration of the driver, or may determine whether the driver is dozing. The in-vehicle information detecting unit 7500 may subject an audio signal obtained by the collection of the sound to processing such as noise canceling processing or the like.

The integrated control unit 7600 controls general operation within the vehicle control system 7000 in accordance with various kinds of programs. The integrated control unit 7600 is connected with an input section 7800. The input section 7800 is implemented by a device capable of input operation by an occupant, such, for example, as a touch panel, a button, a microphone, a switch, a lever, or the like. The integrated control unit 7600 may be supplied with data obtained by voice recognition of voice input through the microphone. The input section 7800 may, for example, be a remote control device using infrared rays or other radio waves, or an external connecting device such as a mobile telephone, a personal digital assistant (PDA), or the like that supports operation of the vehicle control system 7000. The input section 7800 may be, for example, a camera. In that case, an occupant can input information by gesture. Alternatively, data may be input which is obtained by detecting the movement of a wearable device that an occupant wears. Further, the input section 7800 may, for example, include an input control circuit or the like that generates an input signal on the basis of information input by an occupant or the like using the above-described input section 7800, and which outputs the generated input signal to the integrated control unit 7600. An occupant or the like inputs various kinds of data or gives an instruction for processing operation to the vehicle control system 7000 by operating the input section 7800.

The storage section 7690 may include a read only memory (ROM) that stores various kinds of programs executed by the microcomputer and a random access memory (RAM) that stores various kinds of parameters, operation results, sensor values, or the like. In addition, the storage section 7690 may be implemented by a magnetic storage device such as a hard disc drive (HDD) or the like, a semiconductor storage device, an optical storage device, a magneto-optical storage device, or the like.

The general-purpose communication I/F 7620 is a communication I/F used widely, which communication I/F mediates communication with various apparatuses present in an external environment 7750. The general-purpose communication I/F 7620 may implement a cellular communication protocol such as global system for mobile communications (GSM (registered trademark)), worldwide interoperability for microwave access (WiMAX (registered trademark)), long term evolution (LTE (registered trademark)), LTE-advanced (LTE-A), or the like, or another wireless communication protocol such as wireless LAN (referred to also as wireless fidelity (Wi-Fi (registered trademark)), Bluetooth (registered trademark), or the like. The general-purpose communication I/F 7620 may, for example, connect to an apparatus (for example, an application server or a control server) present on an external network (for example, the Internet, a cloud network, or a company-specific network) via a base station or an access point. In addition, the general-purpose communication I/F 7620 may connect to a terminal present in the vicinity of the vehicle (which terminal is, for example, a terminal of the driver, a pedestrian, or a store, or a machine type communication (MTC) terminal) using a peer to peer (P2P) technology, for example.

The dedicated communication I/F 7630 is a communication I/F that supports a communication protocol developed for use in vehicles. The dedicated communication I/F 7630 may implement a standard protocol such, for example, as wireless access in vehicle environment (WAVE), which is a combination of institute of electrical and electronic engineers (IEEE) 802.11p as a lower layer and IEEE 1609 as a higher layer, dedicated short range communications (DSRC), or a cellular communication protocol. The dedicated communication I/F 7630 typically carries out V2X communication as a concept including one or more of communication between a vehicle and a vehicle (Vehicle to Vehicle), communication between a road and a vehicle (Vehicle to Infrastructure), communication between a vehicle and a home (Vehicle to Home), and communication between a pedestrian and a vehicle (Vehicle to Pedestrian).

The positioning section 7640, for example, performs positioning by receiving a global navigation satellite system (GNSS) signal from a GNSS satellite (for example, a GPS signal from a global positioning system (GPS) satellite), and generates positional information including the latitude, longitude, and altitude of the vehicle. Incidentally, the positioning section 7640 may identify a current position by exchanging signals with a wireless access point, or may obtain the positional information from a terminal such as a mobile telephone, a personal handyphone system (PHS), or a smart phone that has a positioning function.

The beacon receiving section 7650, for example, receives a radio wave or an electromagnetic wave transmitted from a radio station installed on a road or the like, and thereby obtains information about the current position, congestion, a closed road, a necessary time, or the like. Incidentally, the function of the beacon receiving section 7650 may be included in the dedicated communication I/F 7630 described above.

The in-vehicle device I/F 7660 is a communication interface that mediates connection between the microcomputer 7610 and various in-vehicle devices 7760 present within the vehicle. The in-vehicle device I/F 7660 may establish wireless connection using a wireless communication protocol such as wireless LAN, Bluetooth (registered trademark), near field communication (NFC), or wireless universal serial bus (WUSB). In addition, the in-vehicle device I/F 7660 may establish wired connection by universal serial bus (USB), high-definition multimedia interface (HDMI (registered trademark)), mobile high-definition link (MI-IL), or the like via a connection terminal (and a cable if necessary) not depicted in the figures. The in-vehicle devices 7760 may, for example, include at least one of a mobile device and a wearable device possessed by an occupant and an information device carried into or attached to the vehicle. The in-vehicle devices 7760 may also include a navigation device that searches for a path to an arbitrary destination. The in-vehicle device I/F 7660 exchanges control signals or data signals with these in-vehicle devices 7760.

The vehicle-mounted network I/F 7680 is an interface that mediates communication between the microcomputer 7610 and the communication network 7010. The vehicle-mounted network I/F 7680 transmits and receives signals or the like in conformity with a predetermined protocol supported by the communication network 7010.

The microcomputer 7610 of the integrated control unit 7600 controls the vehicle control system 7000 in accordance with various kinds of programs on the basis of information obtained via at least one of the general-purpose communication I/F 7620, the dedicated communication I/F 7630, the positioning section 7640, the beacon receiving section 7650, the in-vehicle device I/F 7660, and the vehicle-mounted network I/F 7680. For example, the microcomputer 7610 may calculate a control target value for the driving force generating device, the steering mechanism, or the braking device on the basis of the obtained information about the inside and outside of the vehicle, and output a control command to the driving system control unit 7100. For example, the microcomputer 7610 may perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like. In addition, the microcomputer 7610 may perform cooperative control intended for automatic driving, which makes the vehicle to travel autonomously without depending on the operation of the driver, or the like, by controlling the driving force generating device, the steering mechanism, the braking device, or the like on the basis of the obtained information about the surroundings of the vehicle.

The microcomputer 7610 may generate three-dimensional distance information between the vehicle and an object such as a surrounding structure, a person, or the like, and generate local map information including information about the surroundings of the current position of the vehicle, on the basis of information obtained via at least one of the general-purpose communication I/F 7620, the dedicated communication I/F 7630, the positioning section 7640, the beacon receiving section 7650, the in-vehicle device I/F 7660, and the vehicle-mounted network I/F 7680. In addition, the microcomputer 7610 may predict danger such as collision of the vehicle, approaching of a pedestrian or the like, an entry to a closed road, or the like on the basis of the obtained information, and generate a warning signal. The warning signal may, for example, be a signal for producing a warning sound or lighting a warning lamp.

The sound/image output section 7670 transmits an output signal of at least one of a sound and an image to an output device capable of visually or auditorily notifying information to an occupant of the vehicle or the outside of the vehicle. In the example of FIG. 10, an audio speaker 7710, a display section 7720, and an instrument panel 7730 are illustrated as the output device. The display section 7720 may, for example, include at least one of an on-board display and a head-up display. The display section 7720 may have an augmented reality (AR) display function. The output device may be other than these devices, and may be another device such as headphones, a wearable device such as an eyeglass type display worn by an occupant or the like, a projector, a lamp, or the like. In a case where the output device is a display device, the display device visually displays results obtained by various kinds of processing performed by the microcomputer 7610 or information received from another control unit in various forms such as text, an image, a table, a graph, or the like. In addition, in a case where the output device is an audio output device, the audio output device converts an audio signal constituted of reproduced audio data or sound data or the like into an analog signal, and auditorily outputs the analog signal.

Incidentally, at least two control units connected to each other via the communication network 7010 in the example depicted in FIG. 10 may be integrated into one control unit. Alternatively, each individual control unit may include a plurality of control units. Further, the vehicle control system 7000 may include another control unit not depicted in the figures. In addition, part or the whole of the functions performed by one of the control units in the above description may be assigned to another control unit. That is, predetermined arithmetic processing may be performed by any of the control units as long as information is transmitted and received via the communication network 7010. Similarly, a sensor or a device connected to one of the control units may be connected to another control unit, and a plurality of control units may mutually transmit and receive detection information via the communication network 7010.

Incidentally, a computer program for realizing the functions of the electronic device 100 according to the present embodiment described with reference to FIG. 1 can be implemented in one of the control units or the like. In addition, a computer readable recording medium storing such a computer program can also be provided. The recording medium is, for example, a magnetic disk, an optical disk, a magneto-optical disk, a flash memory, or the like. In addition, the above-described computer program may be distributed via a network, for example, without the recording medium being used.

In the vehicle control system 7000 described above, the time-of-flight (ToF) system 1 according to the present embodiment described with reference to FIG. 1 can be applied to the integrated control unit 7600 in the application example depicted in FIG. 11.

In addition, at least part of the constituent elements of the information processing device described with reference to may be implemented in a module (for example, an integrated circuit module formed with a single die) for the integrated control unit 7600 depicted in FIG. 11. Alternatively, the time-of-flight (ToF) system 1 described with reference to FIG. 1 may be implemented by a plurality of control units of the vehicle control system 7000 depicted in FIG. 11

The methods as described herein are also implemented in some embodiments as a computer program causing a computer and/or a processor to perform the method, when being carried out on the computer and/or processor. In some embodiments, also a non-transitory computer-readable recording medium is provided that stores therein a computer program product, which, when executed by a processor, such as the processor described above, causes the methods described herein to be performed.

It should be recognized that the embodiments describe methods with an exemplary ordering of method steps. The specific ordering of method steps is however given for illustrative purposes only and should not be construed as binding. For example the ordering in the embodiment of FIGS. 5 and 8 may be exchanged.

It should be noted that the number of sub-ROI and the number of bright regions/dark regions in FIGS. 4, 5 and 8 is only made for illustration purposes and that the present disclosure is not limited to any specific form or number of sub-ROI and not limited to any specific form or number of bright regions/dark regions.

In the embodiment of FIG. 4 an intensity ratio, which is an example of an intensity function, is determined to detect atmospheric aerosols particles (e.g. fog, mist, dust etc.) for the respective sub-ROI. However, in alternative embodiments also other intensity function may be calculated.

Further, it should be noted that in FIGS. 4 and 5 it is only shown that a binary flag is applied to the recorded frame. However, it is also possible to apply multiple thresholds so that multiple flags can be applied to the recorded frame to indicate the density of the atmospheric aerosols particles. Furthermore, it should be noted that the detection of atmospheric aerosols particles (e.g. fog, mist, dust etc.) is not only performed for a frame to obtain depth image data, but it is also possible to apply the detection of atmospheric aerosols particles to each sub-frames, e.g. phase I (0°), phase Q (90°), phase Ib (180°) and phase Qb (270°) to capture the depth image data.

In FIGS. 8 to 9 The bright regions may correspond to accurate depth values, but have a lower-resolution. In this embodiment the bright regions are used for generating distortion image data. Alternatively, the dark regions may be used or both bright regions and dark regions may be used for generating distortion image data.

The method can also be implemented as a computer program causing a computer and/or a processor, such as processor (see 7610 of FIG. 10) discussed above, to perform the method, when being carried out on the computer and/or processor. In some embodiments, also a non-transitory computer-readable recording medium is provided that stores therein a computer program product, which, when executed by a processor, such as the processor described above, causes the method described to be performed.

All units and entities described in this specification and claimed in the appended claims can, if not stated otherwise, be implemented as integrated circuit logic, for example on a chip, and functionality provided by such units and entities can, if not stated otherwise, be implemented by software.

In so far as the embodiments of the disclosure described above are implemented, at least in part, using software-controlled data processing apparatus, it will be appreciated that a computer program providing such software control and a transmission, storage or other medium by which such a computer program is provided are envisaged as aspects of the present disclosure.

In the example of FIG. 10 the processes of the embodiments are implemented within a vehicle, e.g. in a device or system for detection of atmospheric aerosols particles or atmospheric precipitation particles. However, as noted already above, the processes may also be implemented in other devices such as Head-Mounted Display (HMD), smart glasses, mobile phone (Smartphone), surveillance systems, and the like. In such cases, many of the units which are described in FIG. 9 are not necessary or optional or might be replaced by other functional units, for example, the driving system control unit 7100 in FIG. 10, the body system control unit 7200 in FIG. 10, etc.

Note that the present technology can also be configured as described below.

[1] An imaging system comprising circuitry configured to obtain (S2) image data of a scene that is illuminated with patterned light (PL), determine (S5, S6) bright regions and dark regions based on the image data, and relate image information related to the bright regions to image information related to the dark regions in order to determine characteristics of atmospheric aerosol particles (AP).

[2] The imaging system of [1], wherein the circuitry is configured to calculate an intensity ratio (f) based on the image information related to the bright regions and the image information related to the dark regions.

[3] The imaging system of [2], wherein the circuitry is further configured to compare the intensity ratio (f) with a threshold value.

[4] The imaging system of any of the previous items, wherein the circuitry is configured to determine if atmospheric aerosol particles (AP) are present.

[5] The imaging system of any of the previous items comprising circuitry configured to illuminate the scene (3) with patterned light (PL).

[6] The imaging system of [5], wherein the patterned light (PL) comprises high-intensity light areas (5) and low-intensity light areas (6).

[7] The imaging system of any of the previous items, wherein the circuitry is further configured to determine intensity information of the image data for each pixel of the image.

[8] The imaging system of any of the previous items, wherein the circuitry is further configured to apply a local-maxima filter on the image information to identify the bright regions.

[9] The imaging system of any of the previous items, wherein the circuitry is further configured to apply a local-minima filter on the image information to identify the dark regions.

[10] The imaging system of any of the previous items, wherein the image information related to the bright regions and the image information related to the dark regions comprises intensity information.

[11] The imaging system of any of the previous items, wherein the circuitry is further configured to determine regions of interest (R1, R1, R3, R4, R5, R6) within the image data and to relate, for each region of interest, image information related to the bright regions to image information related to the dark regions in order to determine characteristics of atmospheric aerosol particles (AP).

[12] A method to:
obtain (S2) image data of a scene that is illuminated with patterned light (PL),
determine (S5, S6) bright regions and dark regions based on the image data,
relate image information related to the bright regions to image information related to the dark regions in order to determine characteristics of atmospheric aerosol particles (AP).

[13] An imaging system comprising circuitry configured to:
obtain a first image data (n−1) of a scene that is illuminated with patterned light (PL) and a second image data (n−1) of a scene that is illuminated with patterned light (PL), and
to compare the first image data (n−1) with the second image data (n) in order to determine characteristics of atmospheric precipitation particles (P1, P2, P3).

[14] The imaging system of [13], wherein the circuitry is configured to obtain a motion vector field based by comparing the first image data (n−1) with the second image data (n).

[15] The imaging system of [14], wherein the circuitry is further configured to determine an average velocity and average direction angel of the motion vectors of the motion vector field and configured to compare the average velocity with a threshold velocity and the average direction angel of the motion vectors with a threshold angle.

[16] The imaging system of one of the items [13] to [15], wherein the circuitry is configured to determine precipitation articles (P1, P2, P3) are present.

[17] The imaging system of one of the items [13] to [15] comprising circuitry configured to illuminate the scene (3) with patterned light (PL).

[18] The imaging system of [17], wherein the patterned light (PL) comprises high-intensity light areas (5) and low-intensity light areas (6).

[19] The imaging system of one of the items [13] to [18], wherein the circuitry is further configured to determine intensity information of the image data for each pixel of the image.

[20] The imaging system of one of the items [13] to [19], wherein the circuitry is further configured to apply a local-maxima filter on the image information to identify the bright regions.

[21] The imaging system of one of the items [13] to [20], wherein the circuitry is further configured to apply a local-minima filter on the image information to identify the dark regions.

[22] The imaging system of one of the items [13] to [21], wherein the image information related to the bright regions and the image information related to the dark regions comprises intensity information.

[23] The imaging system of one of the items [13] to [22], wherein the circuitry is further configured to determine regions of interest (R1, R1, R3, R4, R5, R6) within the image data and to compare, for each region of interest (R1, R1, R3, R4, R5, R6), the first image data (n−1) with the second image data (n) in order to determine characteristics of atmospheric precipitation particles (P1, P2, P3).

[24] The system of one of the items [13] to [23], wherein the circuitry is further configured to obtain the first image data (n) and the second image data (n−1) based on the bright regions.

[25] A method to:
obtain (S2) image data of a scene that is illuminated with patterned light (PL),
determine (S5, S6) bright regions and dark regions based on the image data,
relate image information related to the bright regions to image information related to the dark regions in order to determine characteristics of atmospheric aerosol particles (AP).

[26] A time of flight camera comprising the imaging system of [1] and the imaging system of [13].

The invention claimed is:
1. An imaging system comprising circuitry configured to:
obtain image data of a scene that is illuminated with patterned light,
determine bright regions and dark regions based on the image data,
obtain image information related to the bright regions and image information related to the dark regions,
calculate an intensity ratio as a ratio of an intensity value associated with the bright regions to an intensity value associated with the dark regions based on the image information related to the bright regions and the image information related to the dark regions, and
compare the intensity ratio with a threshold value in order to determine if atmospheric aerosol particles are present.

2. The imaging system of claim 1, wherein the circuitry is configured to determine characteristics of the atmospheric aerosol particles if atmospheric aerosol particles are present.

3. The imaging system of claim 1 comprising circuitry configured to illuminate the scene with patterned light.

4. The imaging system of claim 3, wherein the patterned light comprises high-intensity light areas and low-intensity light areas.

5. The imaging system of claim 1, wherein the circuitry is further configured to determine intensity information of the image data for each pixel of the image.

6. The imaging system of claim 1, wherein the circuitry is further configured to apply a local-maxima filter on the image information to identify the bright regions.

7. The imaging system of claim 1, wherein the circuitry is further configured to apply a local-minima filter on the image information to identify the dark regions.

8. The imaging system of claim 1, wherein the image information related to the bright regions and the image information related to the dark regions comprises intensity information.

9. The imaging system of claim 1, wherein the circuitry is further configured to determine regions of interest within the image data and to relate, for each region of interest, image information related to the bright regions to image information related to the dark regions in order to determine characteristics of atmospheric aerosol particles.

10. A method to:
obtain image data of a scene that is illuminated with patterned light,
determine bright regions and dark regions based on the image data,
obtain image information related to the bright regions and image information related to the dark regions,
calculate an intensity ratio as a ratio of an intensity value associated with the bright regions to an intensity value associated with the dark regions based on the image information related to the bright regions and the image information related to the dark regions, and
compare the intensity ratio with a threshold value in order to determine characteristics of atmospheric aerosol particles.

11. An imaging system comprising circuitry configured to:
obtain a first image data of a scene that is illuminated with patterned light and a second image data of a scene that is illuminated with patterned light,
obtain a motion vector field by comparing the first image data with the second image data,
determine an average velocity and average direction angle of the motion vectors of the motion vector field, and
compare the average velocity with a threshold velocity and the average direction angle of the motion vectors with a threshold angle in order to determine if atmospheric precipitation particles are present.

12. The imaging system of claim 11, wherein the circuitry is configured to determine characteristics of the precipitation particles if precipitation particles are present.

13. The imaging system of claim 11 comprising circuitry configured to illuminate the scene with patterned light.

14. The imaging system of claim 13, wherein the patterned light comprises high-intensity light areas and low-intensity light areas.

15. The imaging system of claim 11, wherein the circuitry is further configured to determine intensity information of the image data for each pixel of the image.

16. The imaging system of claim 11, wherein the circuitry is further configured to apply a local-maxima filter on the image information to identify the bright regions.

17. The imaging system of claim 11, wherein the circuitry is further configured to apply a local-minima filter on the image information to identify the dark regions.

18. The imaging system of claim 11, wherein the image information related to the bright regions and the image information related to the dark regions comprises intensity information.

19. The imaging system of claim 11, wherein the circuitry is further configured to determine regions of interest within the image data and to compare, for each region of interest, the first image data with the second image data in order to determine characteristics of atmospheric precipitation particles.

20. The system of claim 11, wherein the circuitry is further configured to obtain the first image data and the second image data based on the bright regions.

21. A method to:
obtain a first image data of a scene that is illuminated with patterned light and a second image data of a scene that is illuminated with patterned light, and
obtain a motion vector field by comparing the first image data with the second image data,
determine an average velocity and average direction angle of the motion vectors of the motion vector field, and
compare the average velocity with a threshold velocity and the average direction angle of the motion vectors with a threshold angle in order to determine characteristics of precipitation particles.

22. A time of flight camera comprising the imaging system of claim 1.

* * * * *